United States Patent
Fujisaki

(10) Patent No.: US 7,782,543 B2
(45) Date of Patent: Aug. 24, 2010

(54) ZOOM LENS AND IMAGE PICKUP APPARATUS HAVING THE SAME

(75) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/508,427

(22) Filed: Jul. 23, 2009

(65) Prior Publication Data

US 2010/0033839 A1 Feb. 11, 2010

(30) Foreign Application Priority Data

Aug. 8, 2008 (JP) .............................. 2008-205516

(51) Int. Cl.
G02B 15/14 (2006.01)
(52) U.S. Cl. ...................... 359/687; 359/715; 359/740; 359/774
(58) Field of Classification Search ................. 359/687, 359/715, 740, 774
See application file for complete search history.

(56) References Cited

U.S. PATENT DOCUMENTS

| | | | |
|---|---|---|---|
| 5,963,378 A | 10/1999 | Tochigi | |
| 6,166,864 A | 12/2000 | Horiuchi | |
| 7,088,521 B2 * | 8/2006 | Hamano et al. | 359/686 |
| 7,190,529 B2 | 3/2007 | Miyajima | |
| 7,193,790 B2 * | 3/2007 | Hamano | 359/687 |
| 7,206,137 B2 | 4/2007 | Nakatani | |
| 7,319,562 B2 * | 1/2008 | Itoh | 359/687 |
| 7,365,913 B2 * | 4/2008 | Hamano et al. | 359/687 |
| 7,471,460 B2 * | 12/2008 | Saruwatari | 359/687 |
| 7,505,214 B2 * | 3/2009 | Hamano et al. | 359/689 |
| 7,545,580 B2 * | 6/2009 | Saruwatari | 359/687 |
| 7,609,457 B2 * | 10/2009 | Iwama | 359/687 |
| 7,616,385 B2 * | 11/2009 | Hamano | 359/683 |
| 7,679,836 B2 * | 3/2010 | Fujisaki | 359/687 |
| 2007/0201146 A1 * | 8/2007 | Saruwatari | 359/690 |
| 2009/0040624 A1 * | 2/2009 | Shinohara | 359/687 |
| 2009/0040625 A1 * | 2/2009 | Shinohara et al. | 359/687 |
| 2009/0231710 A1 * | 9/2009 | Saruwatari | 359/557 |
| 2009/0310228 A1 * | 12/2009 | Shinohara | 359/687 |

FOREIGN PATENT DOCUMENTS

JP 2007-212537 A 8/2007

* cited by examiner

Primary Examiner—Evelyn A. Lester
(74) Attorney, Agent, or Firm—Canon U.S.A., Inc. I.P. Division

(57) ABSTRACT

A zoom lens includes a first lens unit having a positive refractive power, a second lens unit having a negative refractive power, a third lens unit having a positive refractive power, and a fourth lens unit having a positive refractive power. The first and third lens units are movable such that they are located closer to the object side at a telephoto end than at a wide-angle end. The fourth lens unit is movable with a locus convex towards the object side. A distance between the first and second lens units at the telephoto end, a distance between the second and third lens units at the telephoto end, a focal length of the first lens unit, a focal length of the second lens unit, and a focal length of the third lens unit, and a focal length of the entire zoom lens at the wide-angle end are appropriately set.

15 Claims, 19 Drawing Sheets

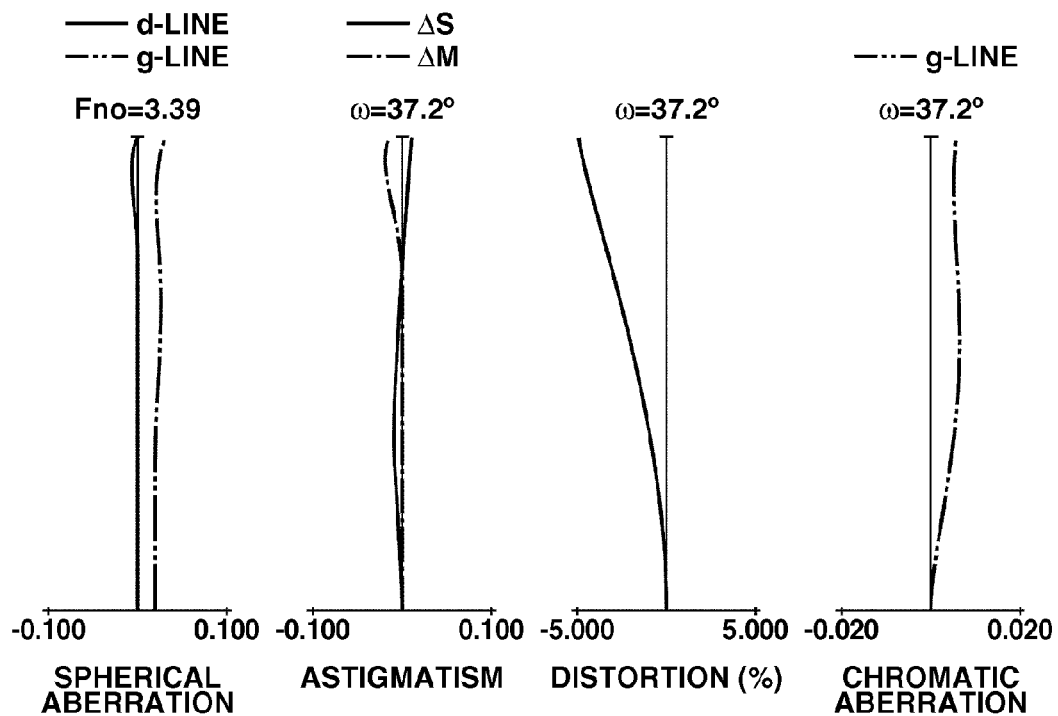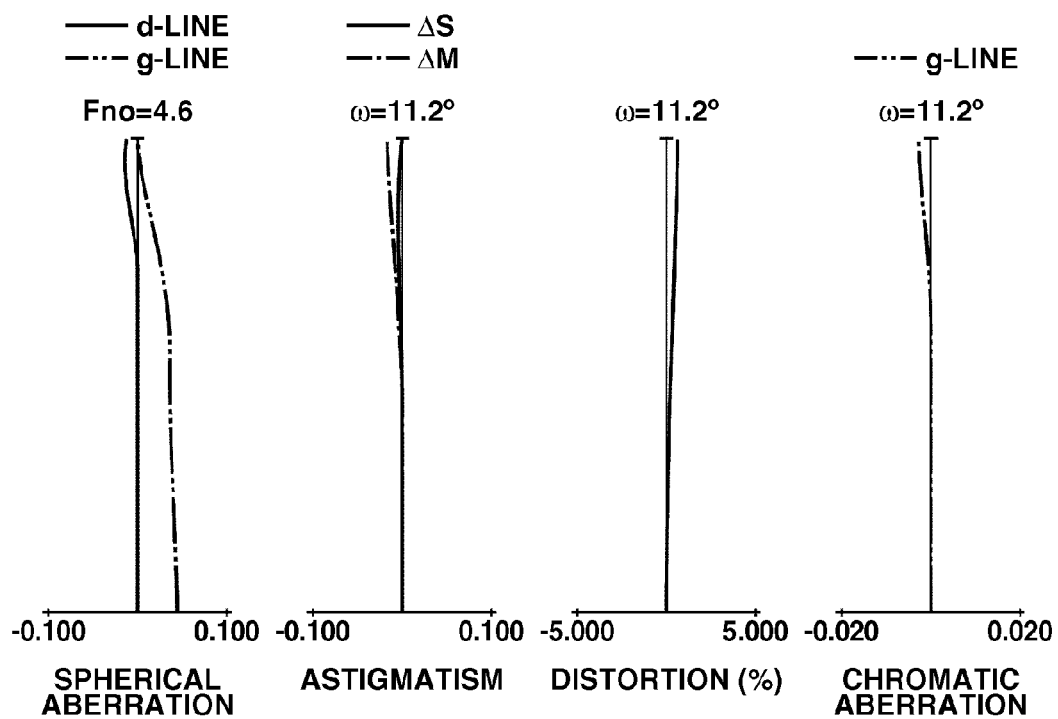

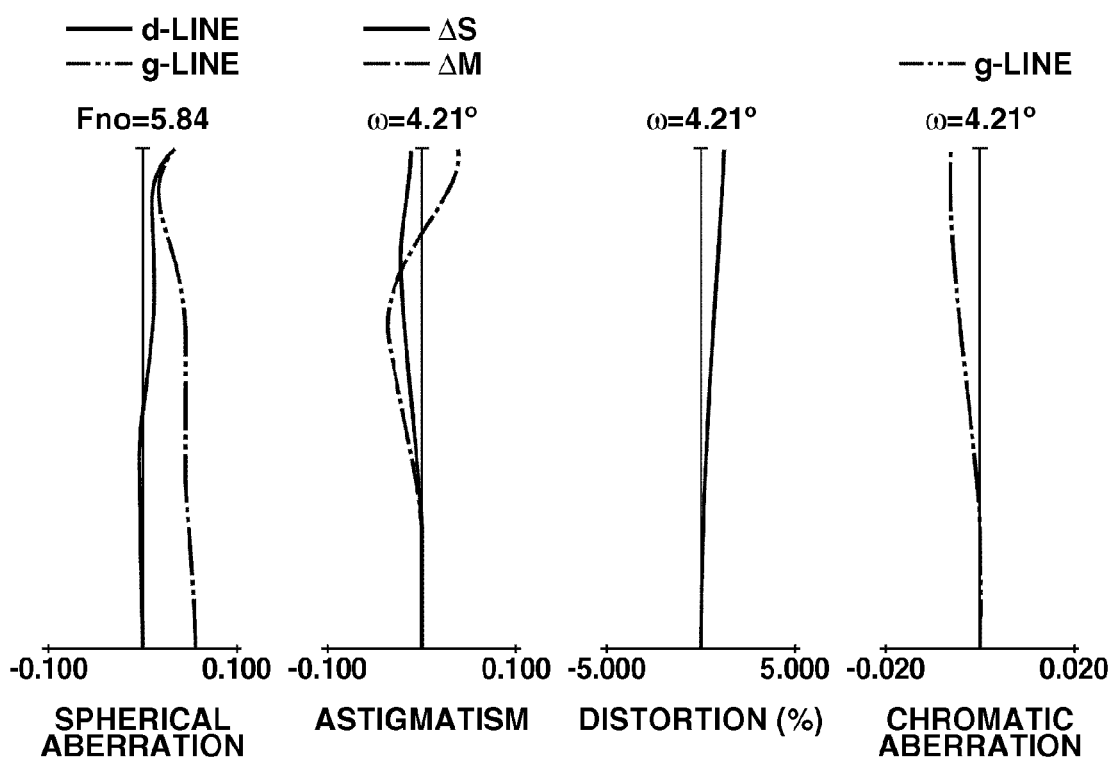

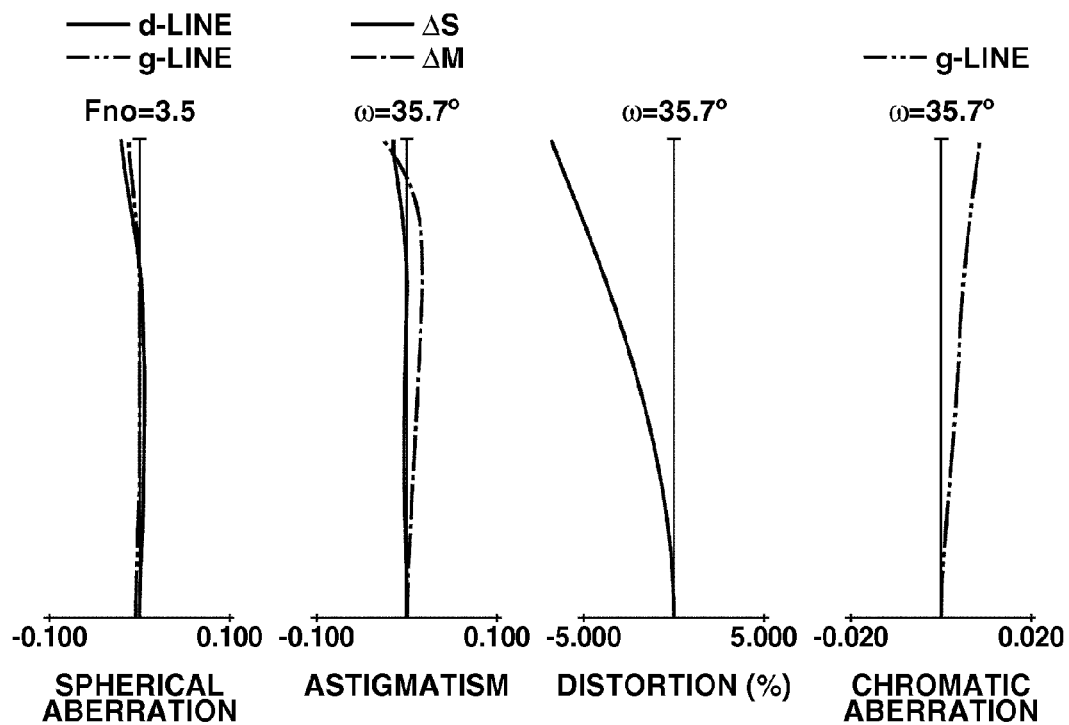
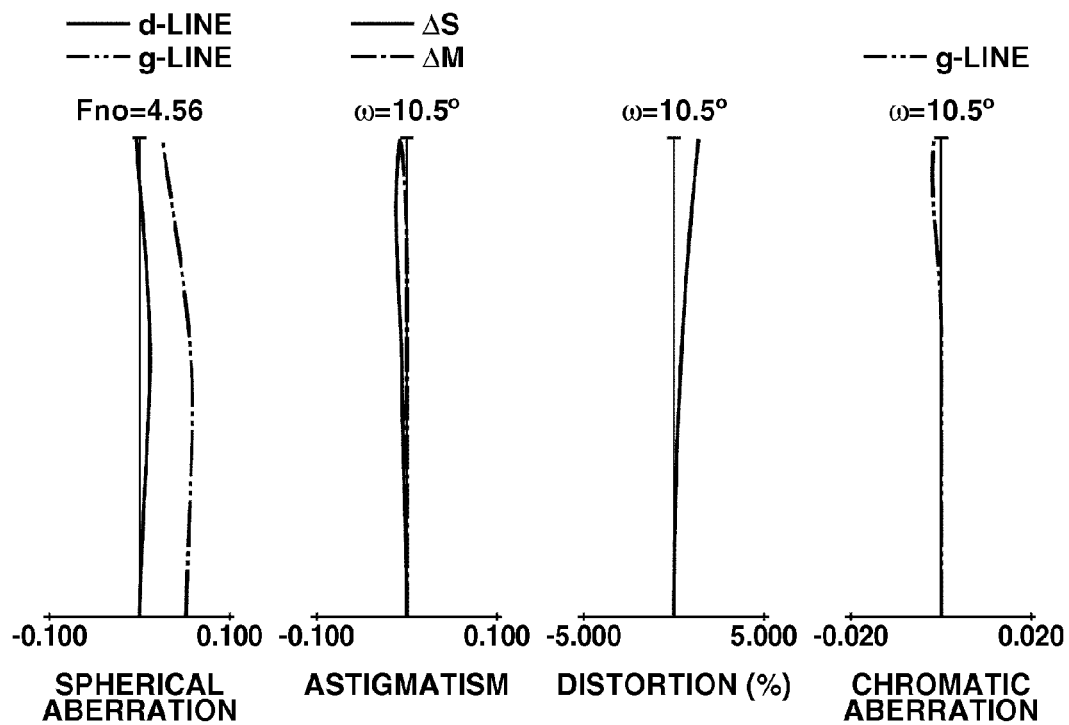

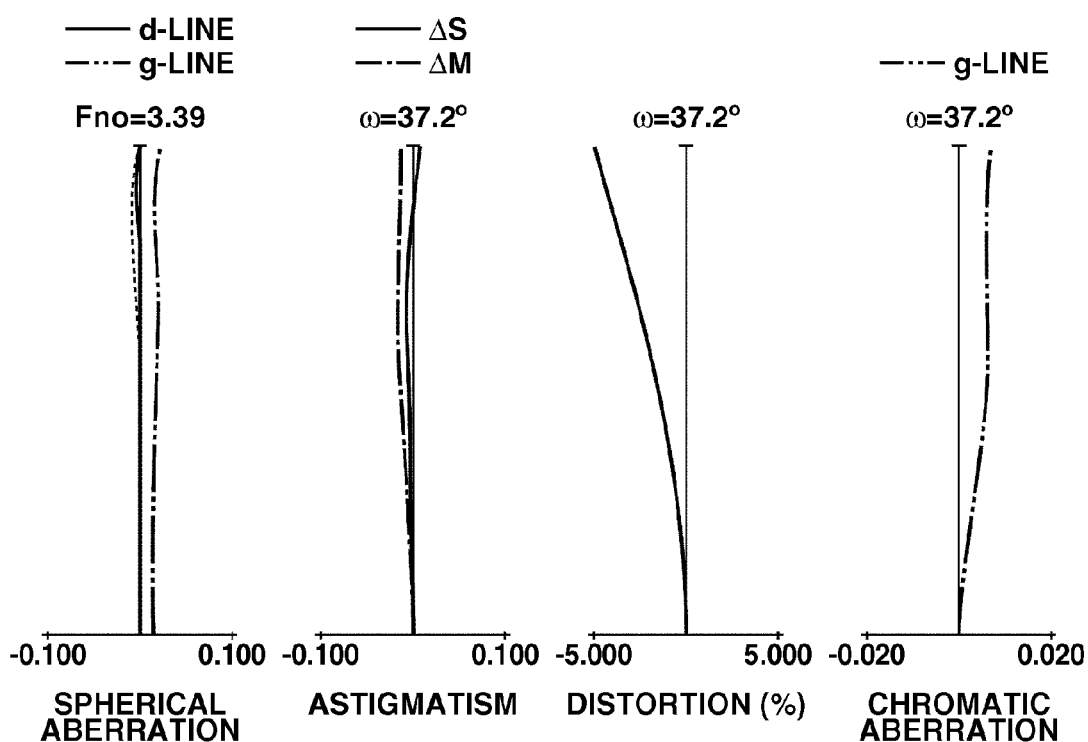
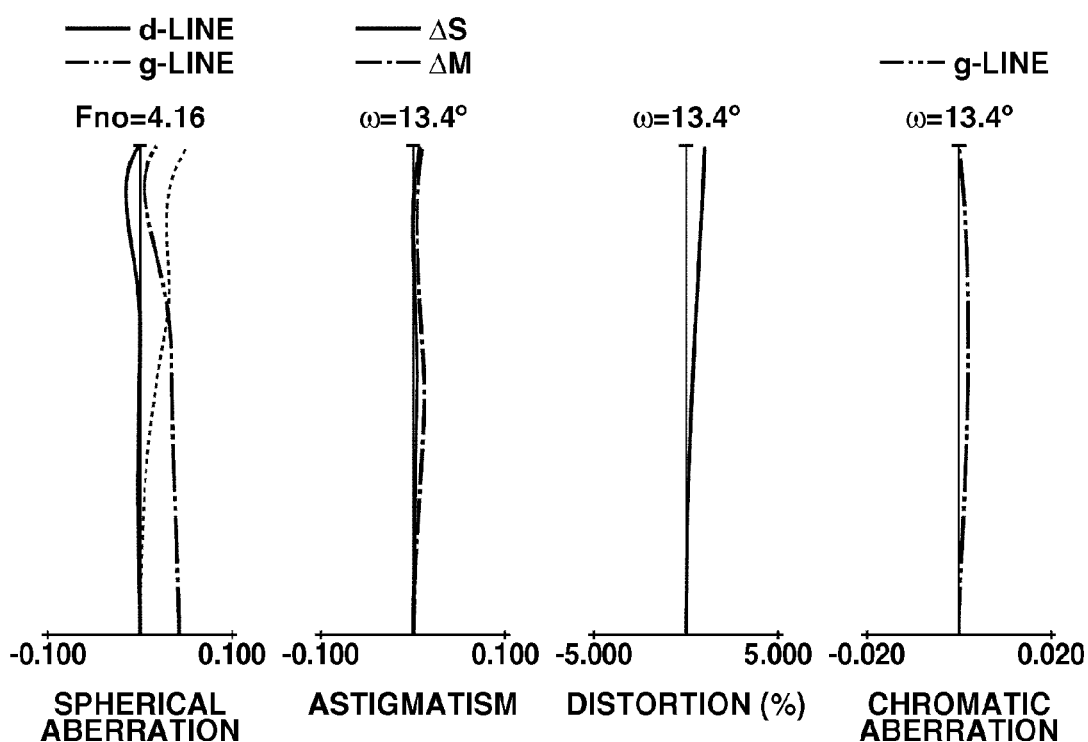

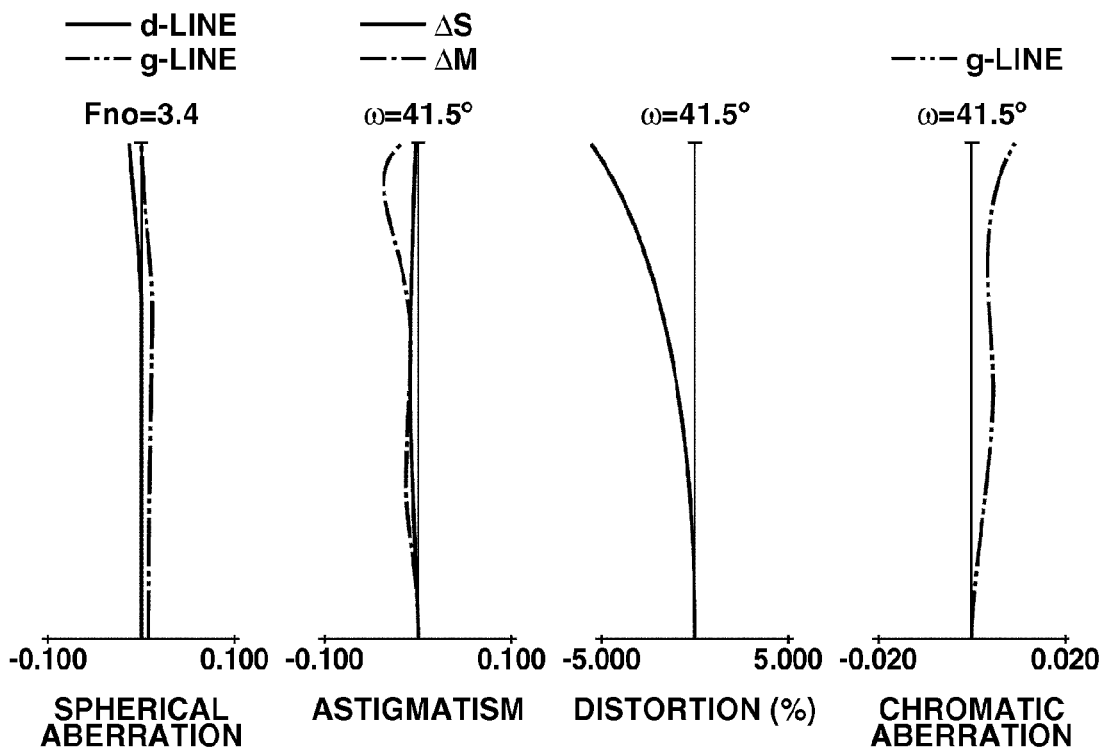
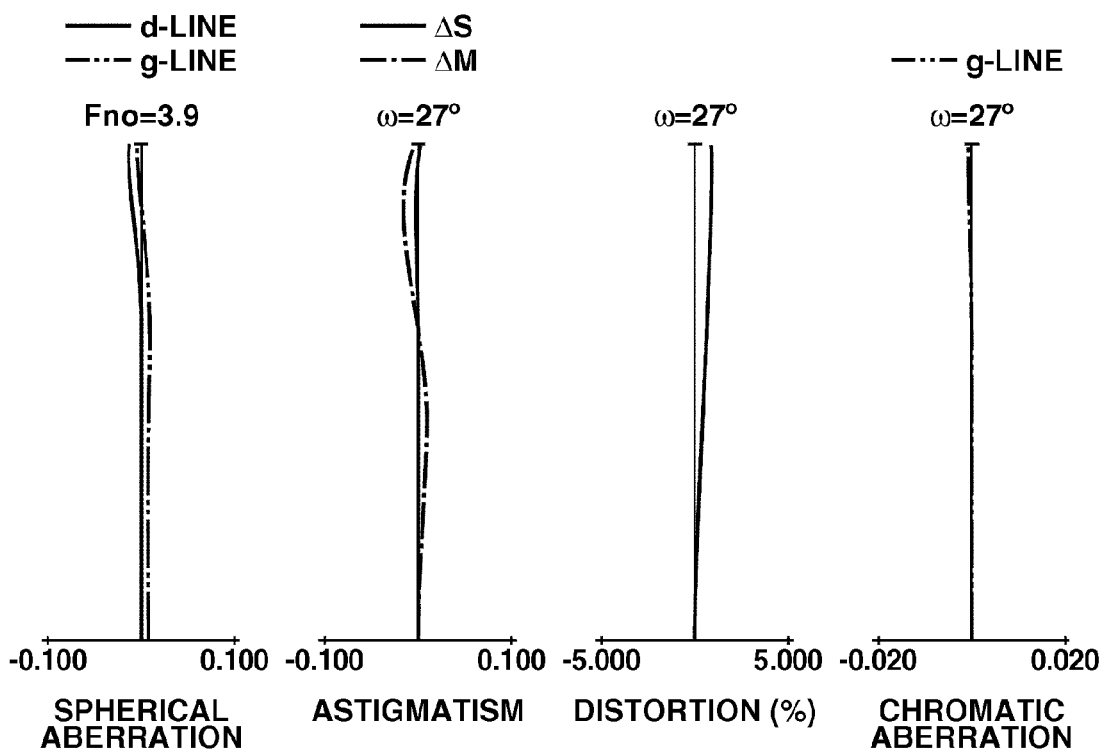

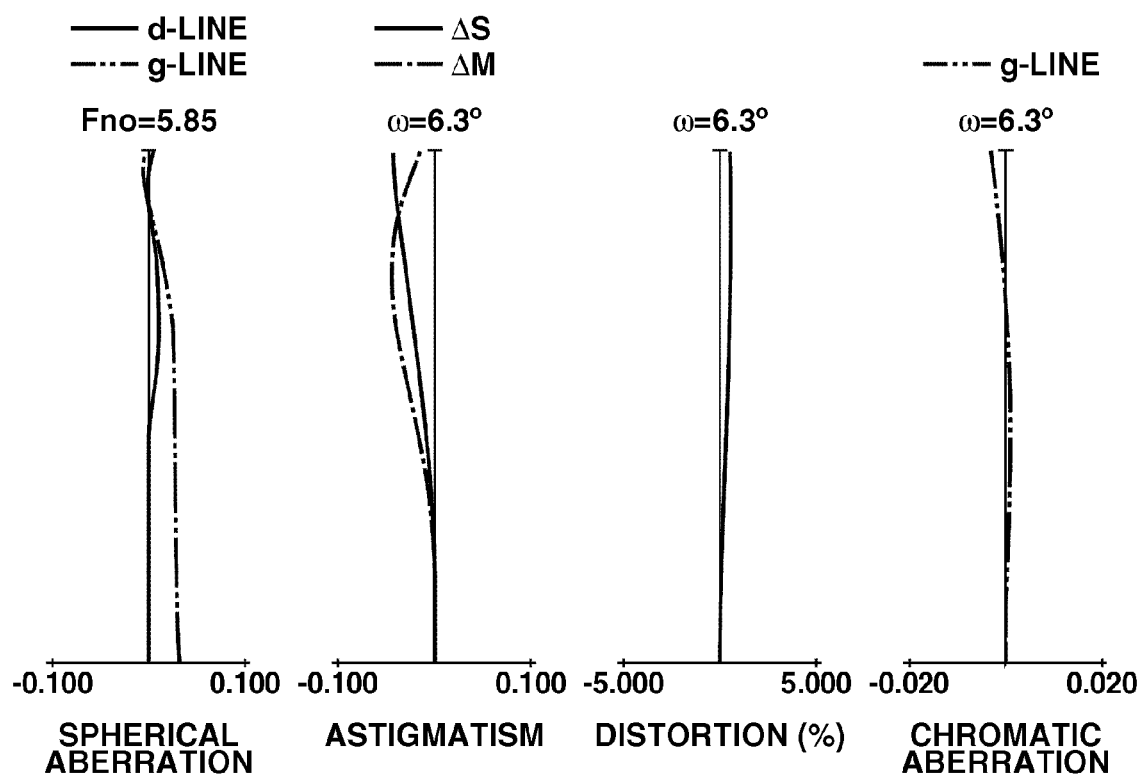

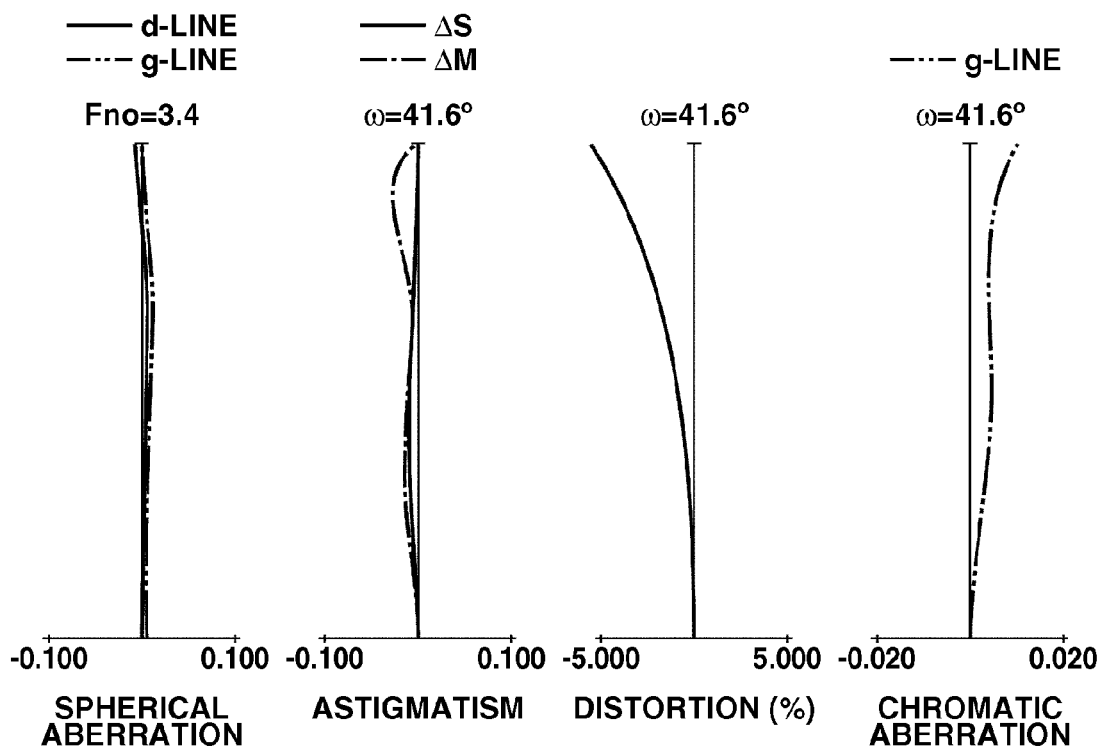
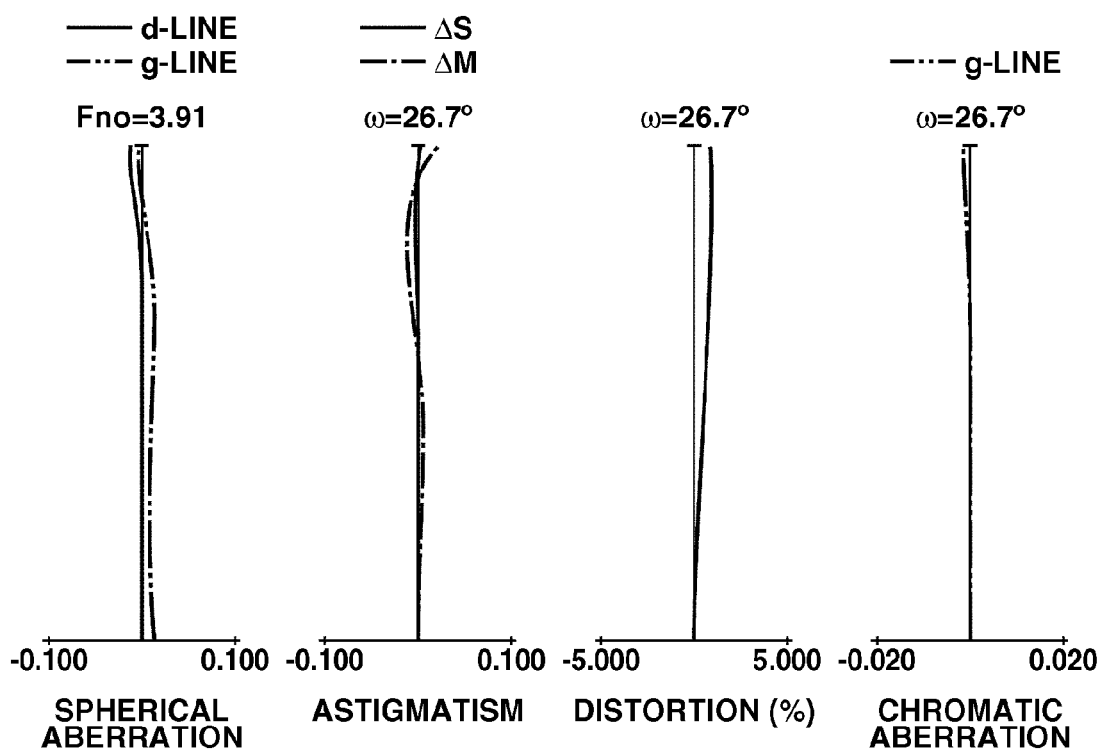

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same. In particular, the present invention relates to a zoom lens useful in an image pickup apparatus, such as a video camera, a digital still camera, a TV camera, or a silver-halide film camera.

2. Description of the Related Art

In recent years, an image pickup apparatus that uses a solid-state image sensor, such as a video camera, a digital still camera, a TV camera, or a silver-halide film camera, has a large number of functions. Furthermore, the size of the entire apparatus is small.

It is desired by the market, in a photographic optical system (zoom lens) used in such an image pickup apparatus, that the length of the entire photographic optical system is short, that the size of the photographic optical system is small, that the photographic optical system has a high zoom ratio, and that a high-resolution image can be captured in the entire zoom range. As a zoom lens that can respond to the desire like this, a rear focus type zoom lens is widely used.

More specifically, the rear focus type zoom lens executes focusing by moving a lent unit other than a first lens unit, which is disposed on the object side. In such a rear focus type zoom lens, the effective diameter of the first lens unit is usually smaller than the effective diameter of the first lens unit of a zoom lens that executes focusing by moving the first lens unit. Accordingly, it is easy to reduce the size of the entire zoom lens.

Moreover, the rear focus type zoom lens executes focusing by moving a small-sized lightweight lens unit. Accordingly, the necessary amount of driving force for driving the lens unit is small. Therefore, the rear focus type zoom lens can quickly focus on the object.

As the rear focus type zoom lens described above, a four-unit zoom lens has been marketed, which includes, in order from the object side to the image side, a first lens unit having a positive refractive power, a second lens unit having a negative refractive power, a third lens unit having a positive refractive power, and a fourth lens unit having a positive refractive power.

U.S. Pat. Nos. 5,963,378 and 6,166,864 discuss a four-unit zoom lens that executes zooming by moving the second lens unit and executes focusing and the compensation of image plane movement caused by zooming by moving the fourth lens unit. In addition, U.S. Pat. No. 7,190,529 and Japanese Patent Application Laid-Open No. 2007-212537 discuss a four-unit zoom lens that executes zooming by moving each lens unit and executes focusing by moving the fourth lens unit.

U.S. Pat. No. 7,206,137 discusses a four-unit or five-unit zoom lens that includes, in order from the object side to the image side, a lens unit having a positive refractive power, a lens unit having a negative refractive power, a lens unit having a positive refractive power, and a lens unit having a positive refractive power. The zoom lens discussed in U.S. Pat. No. 7,206,137 executes zooming by moving the first through the fourth lens units and executes focusing by moving the fourth lens unit.

In order to reduce the size of a zoom lens, it is necessary to reduce the number of lens elements in the zoom lens while increasing the refractive power of each lens unit constituting the zoom lens. However, if a zoom lens has such a configuration the thickness of each lens unit may increase as the refractive power of each lens surface is increased. Accordingly, the length of the entire zoom lens cannot be sufficiently reduced. In addition, it becomes difficult to correct various aberrations, such as chromatic aberration, which may occur at the telephoto end.

Moreover, if the zoom ratio is increased, the degree of manufacturing error such as plane tilt of each lens element or each lens unit may increase. If the sensitivity to decentering of each lens element or each lens unit, the optical performance may greatly degrade due to decentering, and the optical performance during image stabilization may also greatly degrade. Accordingly, in a zoom lens, it is desired to reduce the sensitivity to decentering of each lens element or each lens unit to a level as low as possible.

In the above-described four-unit zoom lens and five-unit zoom lens, in order to achieve a high optical performance while achieving a high zoom ratio and a small-size zoom lens, it is important to appropriately set the refractive power and the lens configuration of each lens unit and a condition for moving each lens unit during zooming.

Particularly, it is important to appropriately set the refractive power of the first through the third lens units and the condition for moving each lens unit during zooming. If the above-described configurations are not appropriately set, it becomes difficult to implement a zoom lens whose total size is small, having a high zoom ratio, and having a high optical performance in the entire zoom range.

SUMMARY OF THE INVENTION

The present invention is directed to a small-sized zoom lens having a high zoom ratio and a high optical performance in the entire zoom range and an image pickup apparatus having the zoom lens.

According to an aspect of the present invention, a zoom lens includes, in order from an object side to an image side, a first lens unit having a positive refractive power, a second lens unit having a negative refractive power, a third lens unit having a positive refractive power, and a fourth lens unit having a positive refractive power. In the zoom lens, each lens unit is movable for zooming, the first lens unit and the third lens unit are movable such that the first lens unit and the third lens unit are located closer to the object side at a telephoto end than at a wide-angle end, and the fourth lens unit is movable with a locus convex towards the object side. Furthermore, in the zoom lens, a distance between the first lens unit and the second lens unit at the telephoto end (DT12), a distance between the second lens unit and the third lens unit at the telephoto end (DT23), a focal length of the first lens unit (f1), a focal length of the second lens unit (f2), and a focal length of the third lens unit (f3), and a focal length of the entire zoom lens at the wide-angle end (fw) satisfy the following conditions:

$0.00 < DT23/DT12 < 0.06$ $6.5 < f1/fw < 30.0$ $-0.75 < f2/f3 < -0.10.$

According to an exemplary embodiment of the present invention, a zoom lens whose total size is small, having a high zoom ratio, and having a high optical performance in the entire zoom range can be implemented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A through 2C are aberration charts of numerical example 1 corresponding to the first exemplary embodiment of the present invention.

FIGS. 4A through 4C are aberration charts of numerical example 2 corresponding to the second exemplary embodiment of the present invention.

FIGS. 6A through 6C are aberration charts of numerical example 3 corresponding to the third exemplary embodiment of the present invention.

FIGS. 10A through 10C are aberration charts of numerical example 5 corresponding to the fifth exemplary embodiment of the present invention.

FIG. 12A through 12C are aberration charts of numerical example 6 corresponding to the sixth exemplary embodiment of the present invention.

DETAILED DESCRIPTION OF THE EMBODIMENTS

Figure 1:
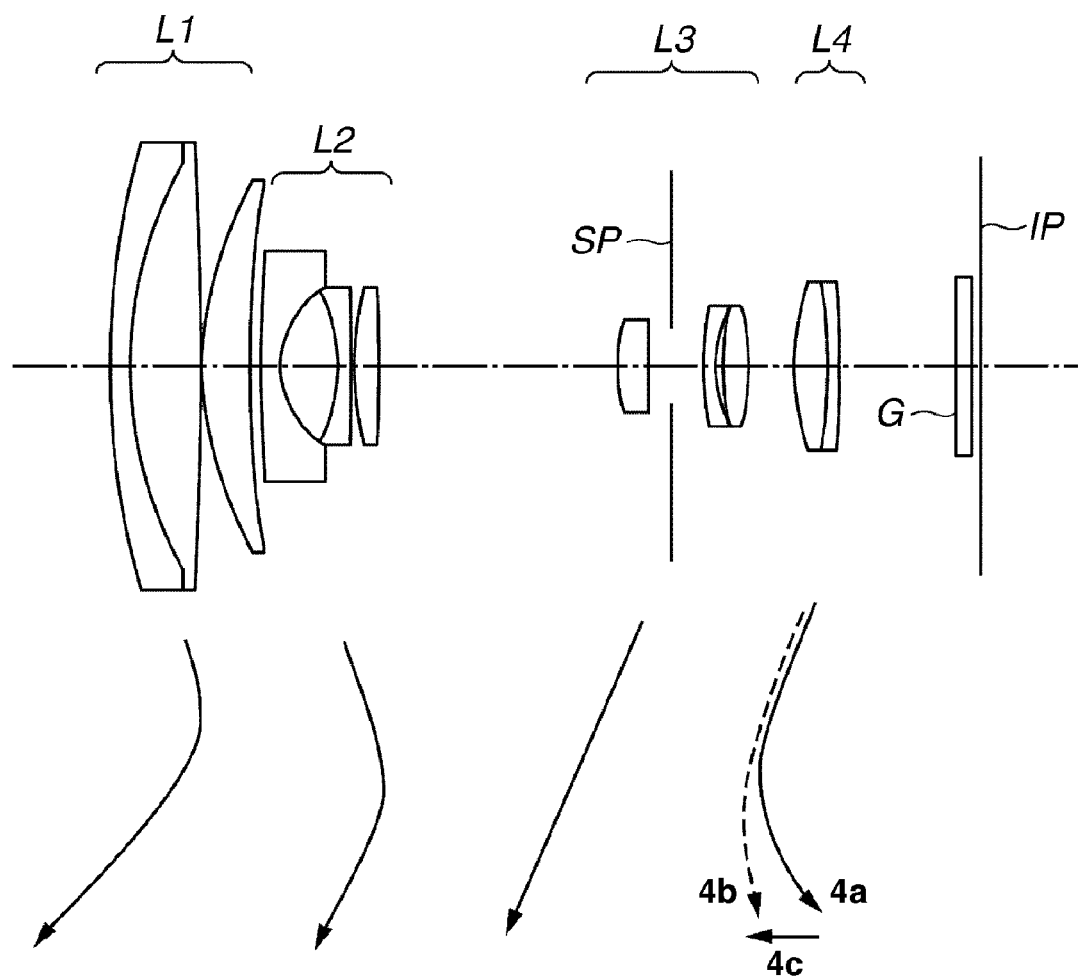
FIG. 1 is a lens cross section at the wide-angle end according to a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

A zoom lens according to an exemplary embodiment of the present invention includes, in order from the object side to the image side, a first lens unit having a positive refractive power, a second lens unit having a negative refractive power, a third lens unit having a positive refractive power, and a fourth lens unit having a positive refractive power. The zoom lens may further include a fifth lens unit having a positive or negative refractive power on the image side of the fourth lens unit.

In the zoom lens according to an exemplary embodiment of the present invention, the first through fourth lens units are movable for zooming. The first lens unit and the third lens unit are movable such that the first lens unit and the third lens unit are located closer to the object side at the telephoto end than at the wide-angle end.

Moreover, the fourth lens unit is movable with a locus convex towards the object side. The fourth lens unit is movable for focusing.

FIG. 1 is a lens cross section of the zoom lens at the wide-angle end (short focal length end) according to a first exemplary embodiment of the present invention. FIG. 2A is a chart illustrating various aberrations occurring in the zoom lens according to the first exemplary embodiment of the present invention at the wide-angle end (short focal length end). FIG. 2B is a chart illustrating various aberrations occurring in the zoom lens according to the first exemplary embodiment of the present invention at a middle focal length. FIG. 2C is a chart illustrating various aberrations occurring in the zoom lens according to the first exemplary embodiment of the present invention at the telephoto end (long focal length end).

Figure 3:
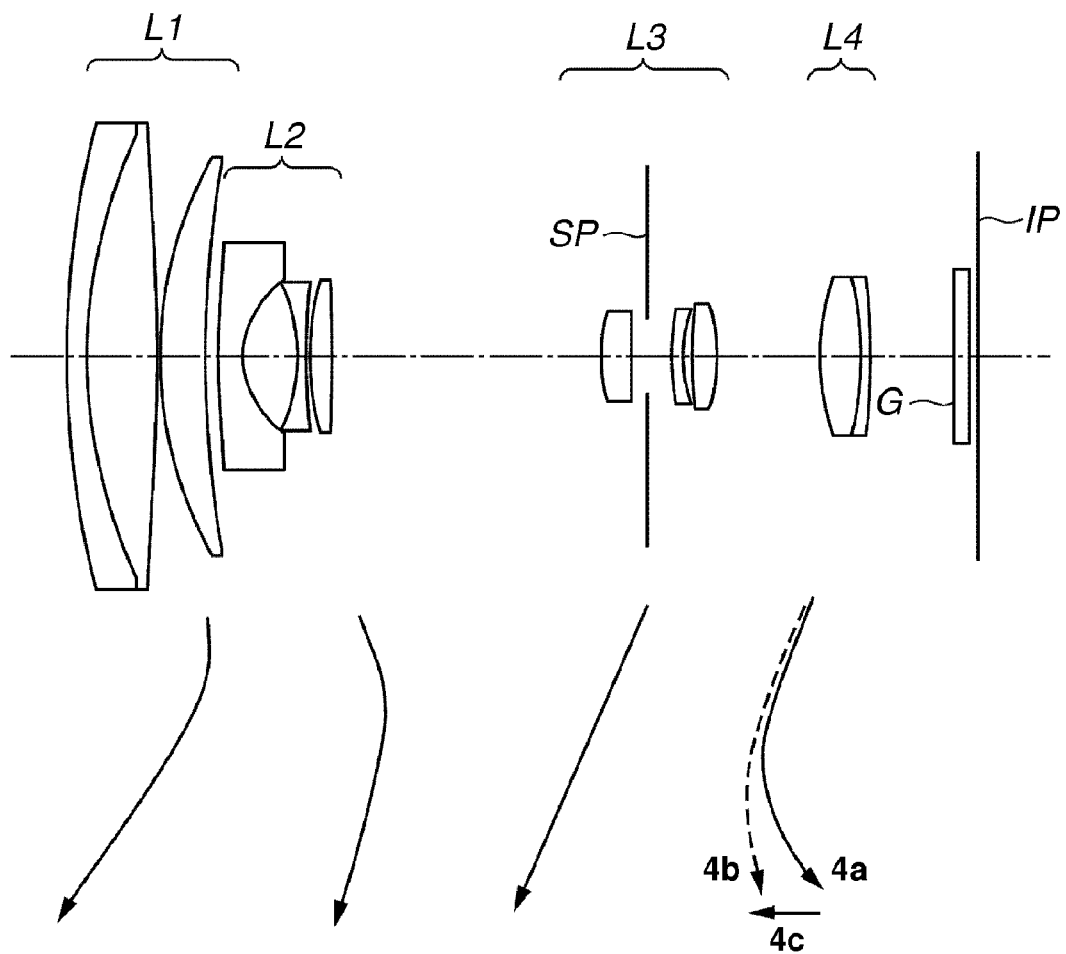
FIG. 3 is a lens cross section at the wide-angle end according to a second exemplary embodiment of the present invention.
Figure 4C:
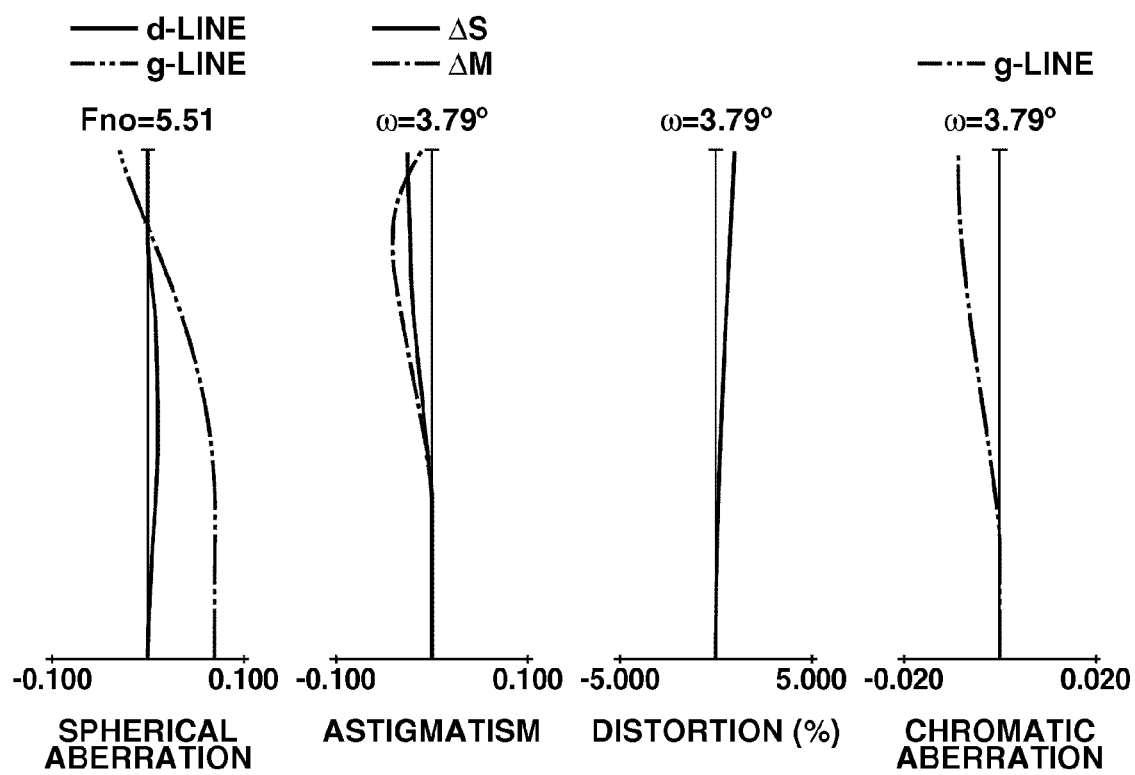

FIG. 3 is a lens cross section of the zoom lens at the wide-angle end according to a second exemplary embodiment of the present invention. FIG. 4A is a chart illustrating various aberrations occurring in the zoom lens according to the second exemplary embodiment of the present invention at the wide-angle end. FIG. 4B is a chart illustrating various aberrations occurring in the zoom lens according to the second exemplary embodiment of the present invention at a middle focal length. FIG. 4C is a chart illustrating various aberrations occurring in the zoom lens according to the second exemplary embodiment of the present invention at the telephoto end.

Figure 5:
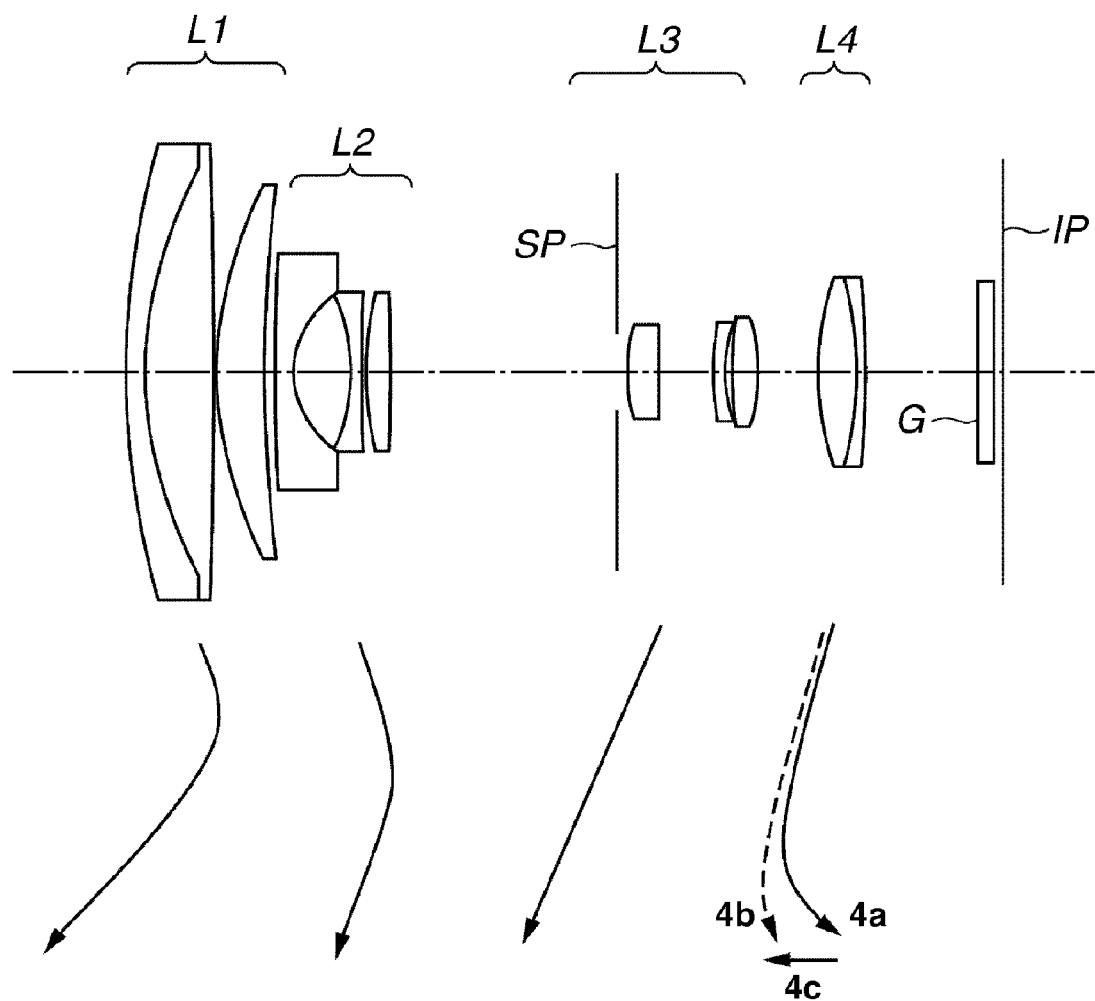
FIG. 5 is a lens cross section at the wide-angle end according to a third exemplary embodiment of the present invention.
Figure 6C:
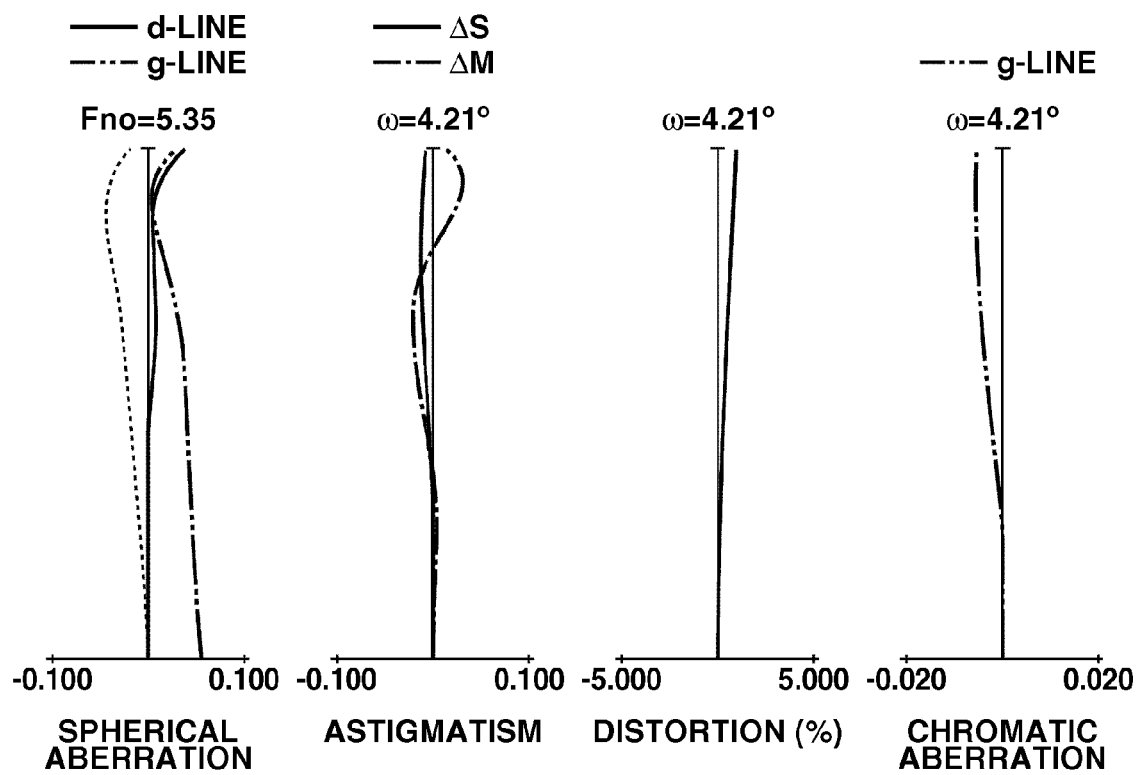

FIG. 5 is a lens cross section of the zoom lens at the wide-angle end according to a third exemplary embodiment of the present invention. FIG. 6A is a chart illustrating various aberrations occurring in the zoom lens according to the third exemplary embodiment of the present invention at the wide-angle end. FIG. 6B is a chart illustrating various aberrations occurring in the zoom lens according to the third exemplary embodiment of the present invention at a middle focal length. FIG. 6C is a chart illustrating various aberrations occurring in the zoom lens according to the third exemplary embodiment of the present invention at the telephoto end.

Figure 7:
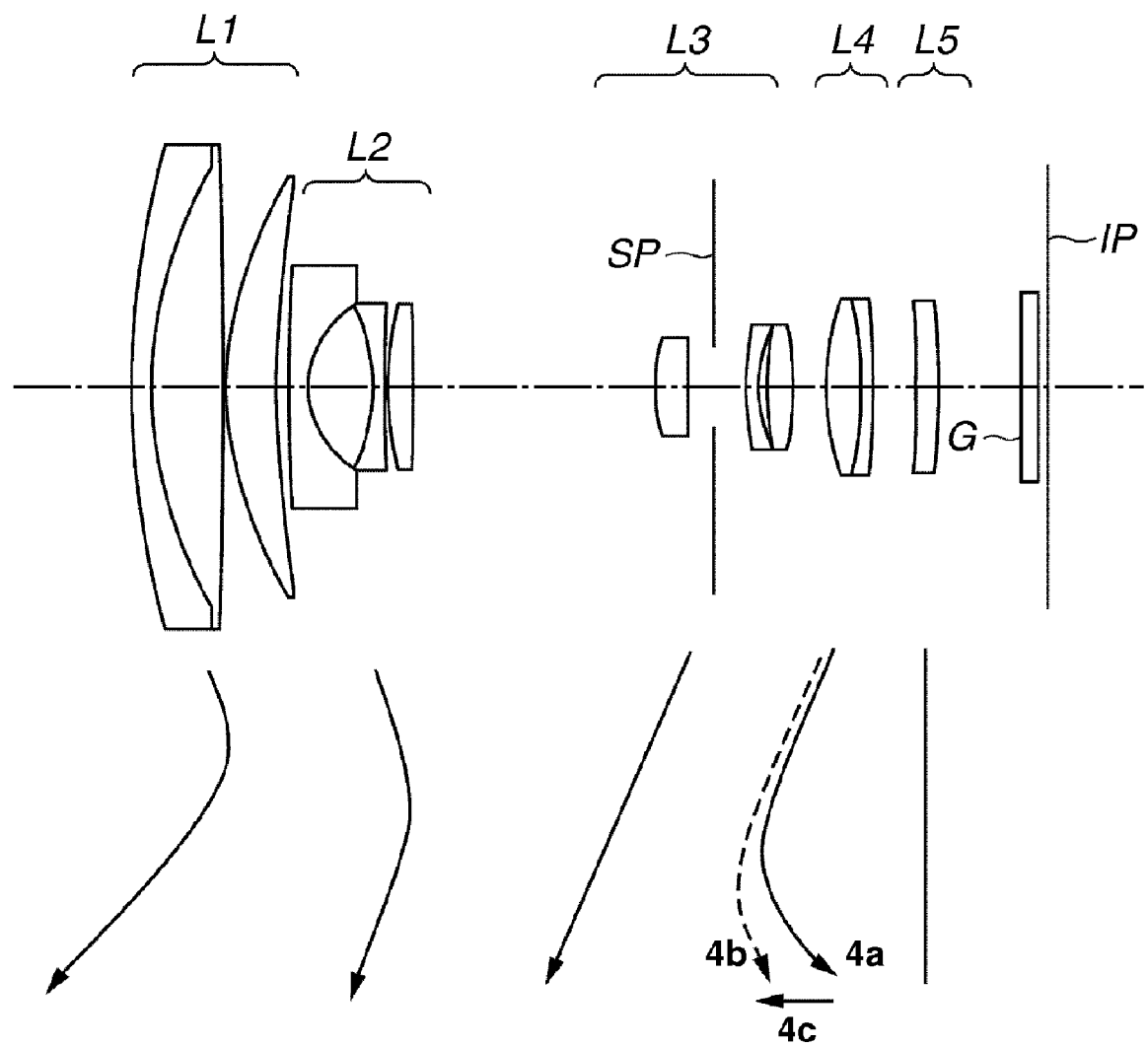
FIG. 7 is a lens cross section at the wide-angle end according to a fourth exemplary embodiment of the present invention.
Figure 8A:
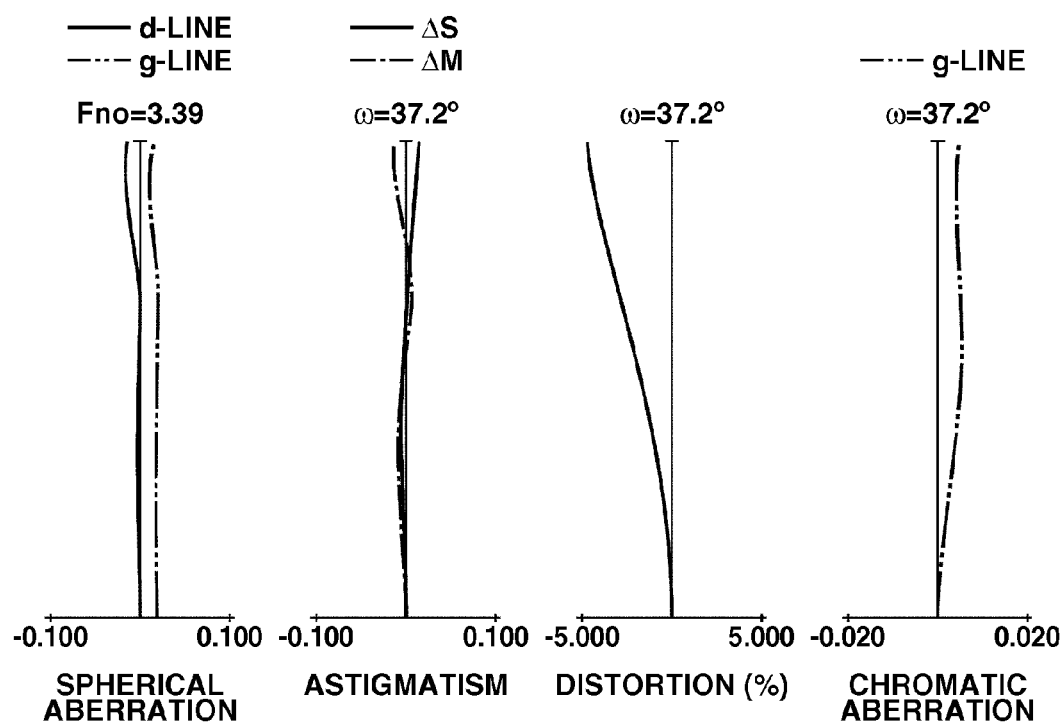
FIGS. 8A through 8C are aberration charts of numerical example 4 corresponding to the fourth exemplary embodiment of the present invention.
Figure 8B:
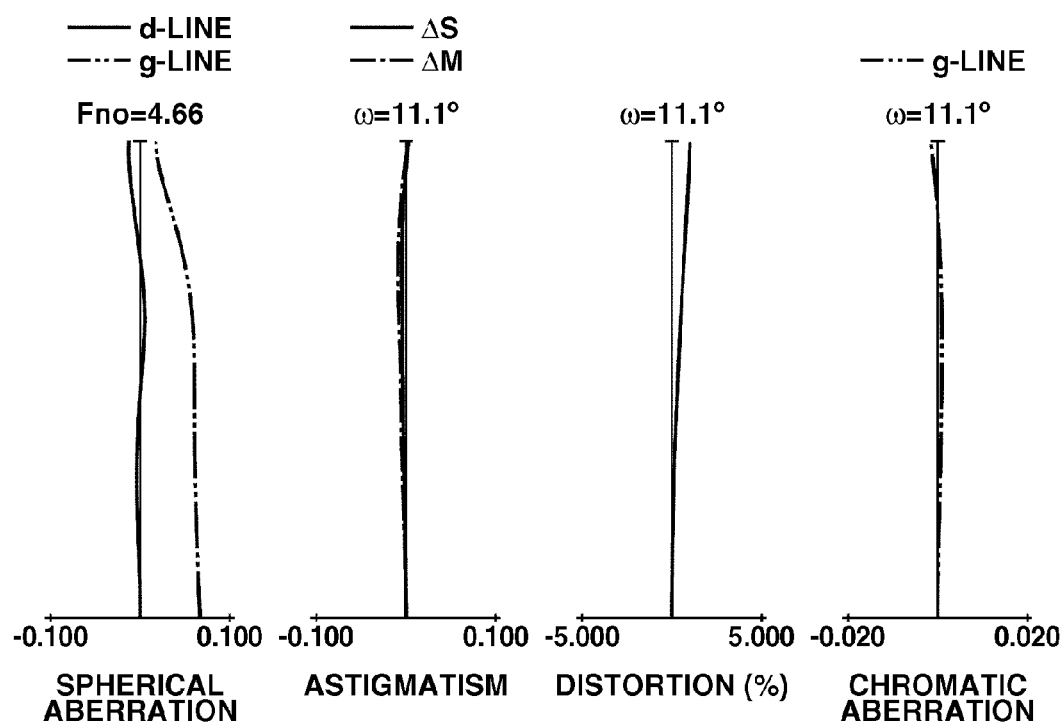

FIG. 7 is a lens cross section of the zoom lens at the wide-angle end according to a fourth exemplary embodiment of the present invention. FIG. 8A is a chart illustrating various aberrations occurring in the zoom lens according to the fourth exemplary embodiment of the present invention at the wide-angle end. FIG. 8B is a chart illustrating various aberrations occurring in the zoom lens according to the fourth exemplary embodiment of the present invention at a middle focal length.

Figure 8C:
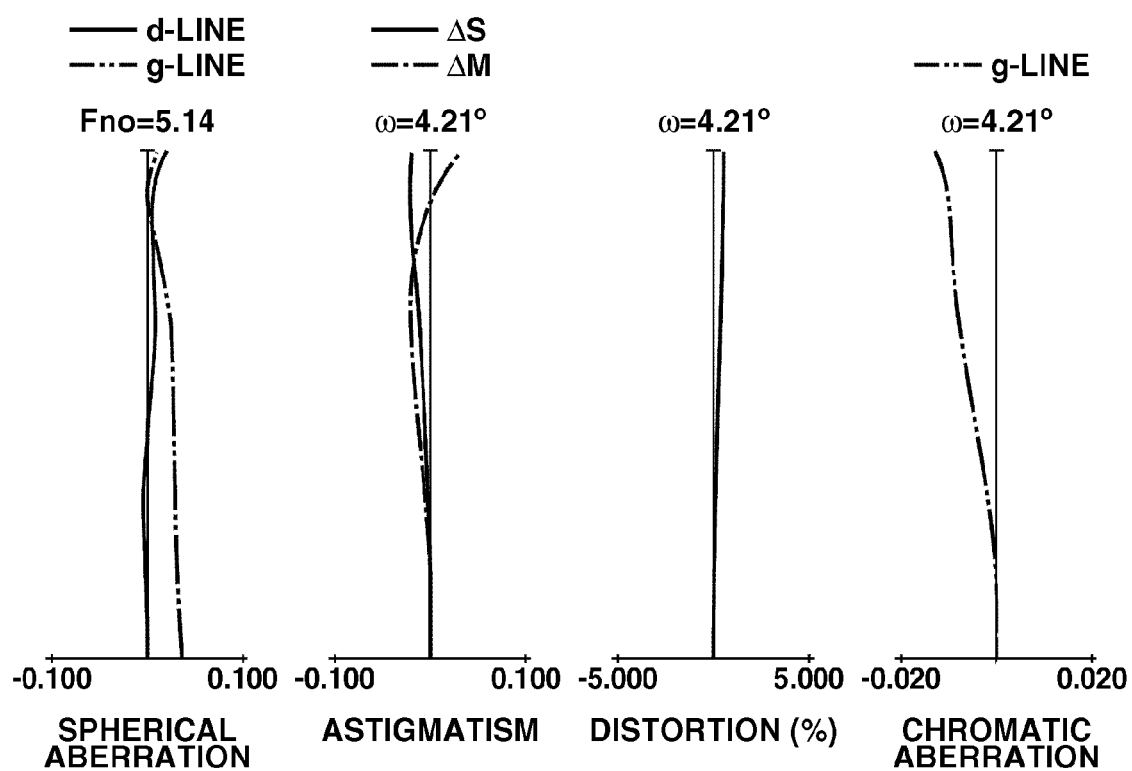

FIG. 8C is a chart illustrating various aberrations occurring in the zoom lens according to the fourth exemplary embodiment of the present invention at the telephoto end.

Figure 9:
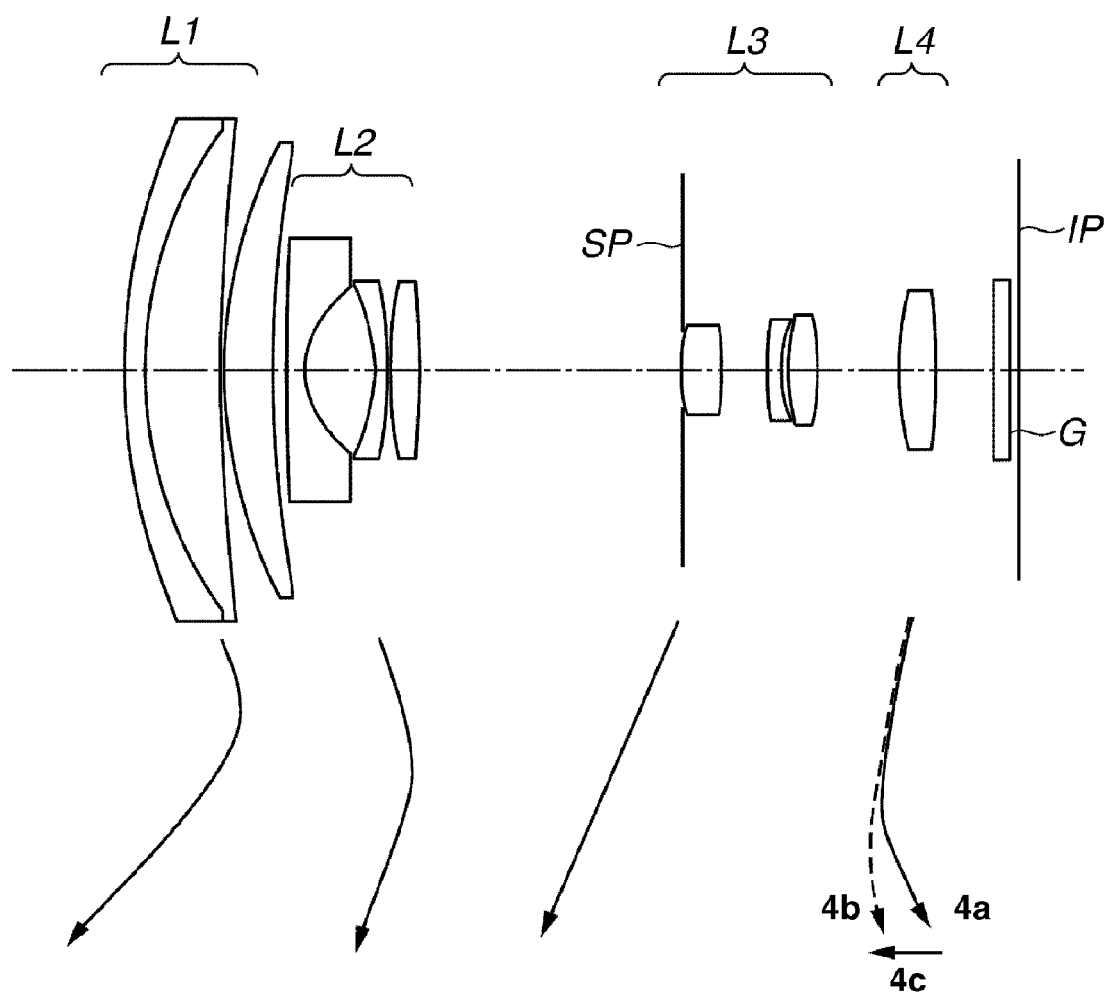
FIG. 9 is a lens cross section at the wide-angle end according to a fifth exemplary embodiment of the present invention.

FIG. 9 is a lens cross section of the zoom lens at the wide-angle end according to a fifth exemplary embodiment of the present invention. FIG. 10A is a chart illustrating various aberrations occurring in the zoom lens according to the fifth exemplary embodiment of the present invention at the wide-angle end. FIG. 10B is a chart illustrating various aberrations occurring in the zoom lens according to the fifth exemplary embodiment of the present invention at a middle focal length. FIG. 10C is a chart illustrating various aberrations occurring in the zoom lens according to the fifth exemplary embodiment of the present invention at the telephoto end.

Figure 11:
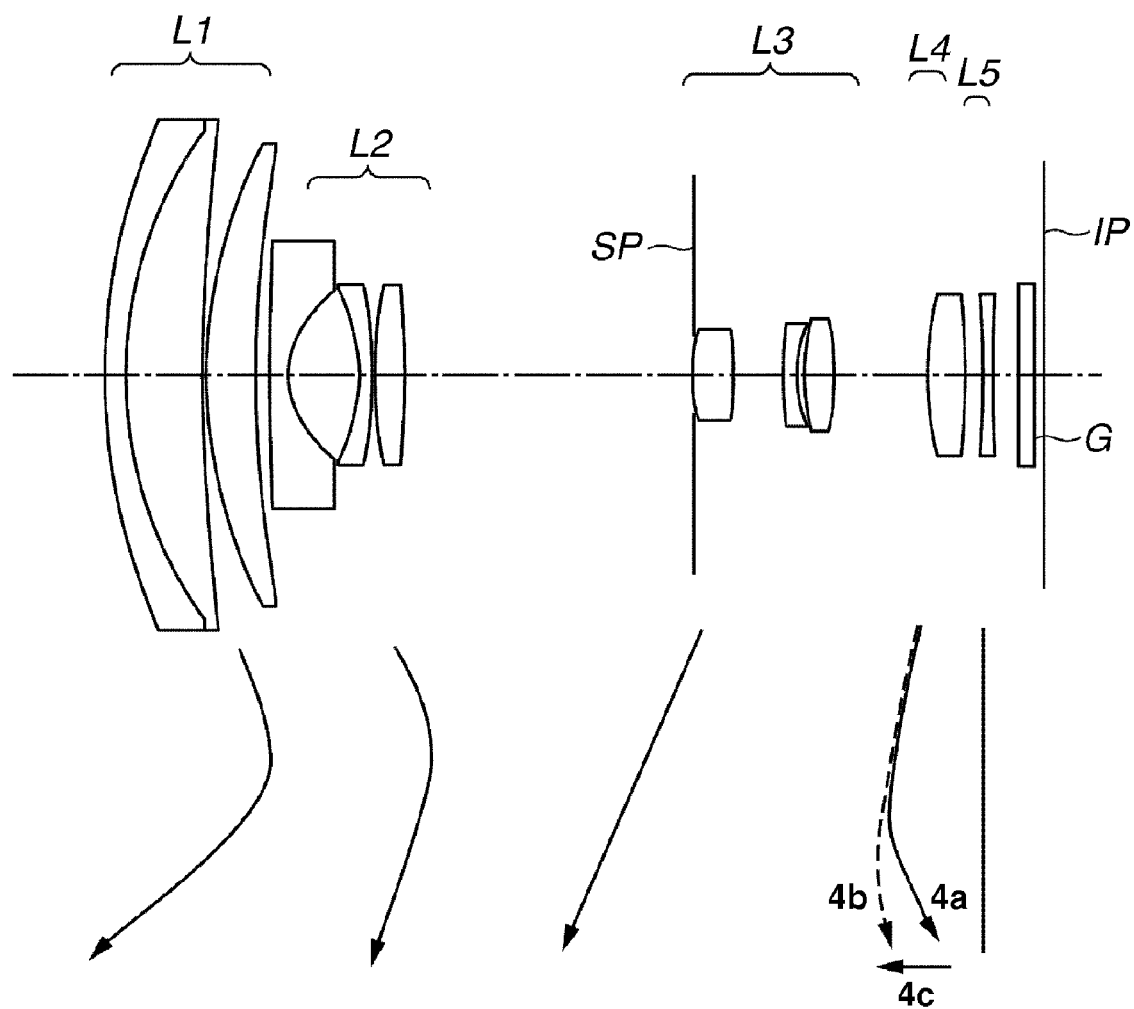
FIG. 11 is a lens cross section at the wide-angle end according to a sixth exemplary embodiment of the present invention.
Figure 12C:
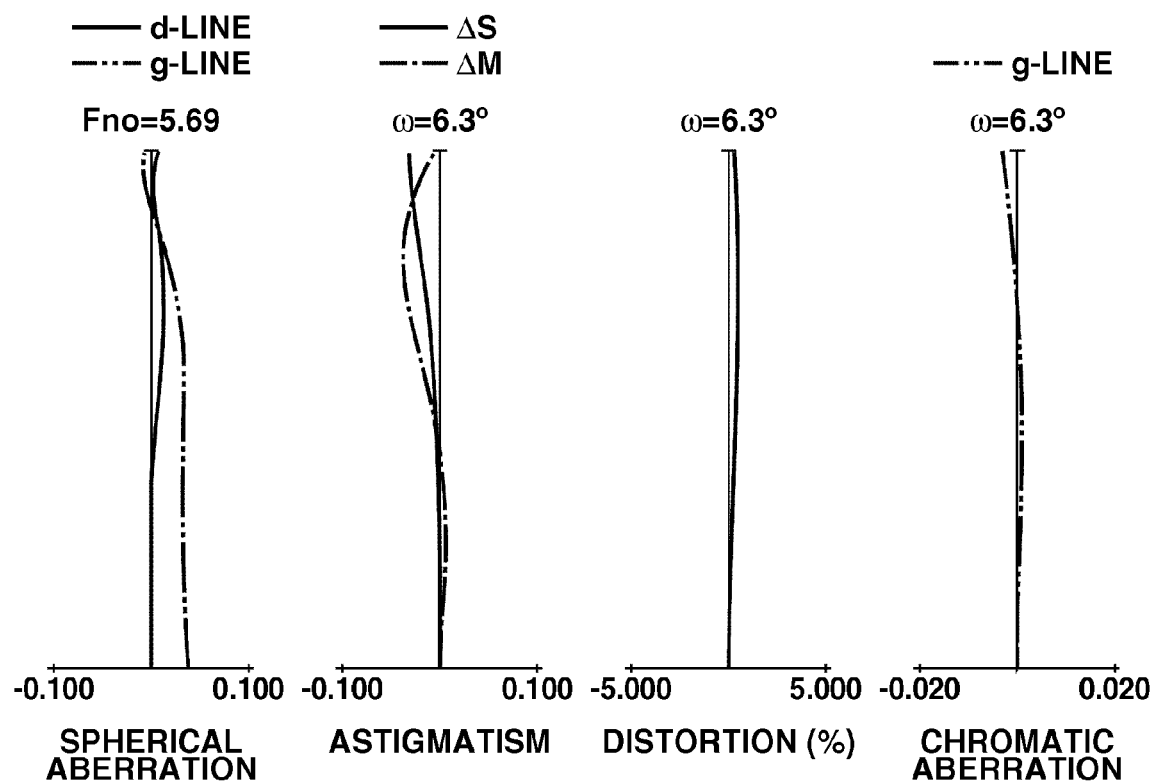

FIG. 11 is a lens cross section of the zoom lens at the wide-angle end according to a sixth exemplary embodiment of the present invention. FIG. 12A is a chart illustrating various aberrations occurring in the zoom lens according to the sixth exemplary embodiment of the present invention at the wide-angle end. FIG. 12B is a chart illustrating various aberrations occurring in the zoom lens according to the sixth exemplary embodiment of the present invention at a middle focal length. FIG. 12C is a chart illustrating various aberrations occurring in the zoom lens according to the sixth exemplary embodiment of the present invention at the telephoto end.

Figure 13:
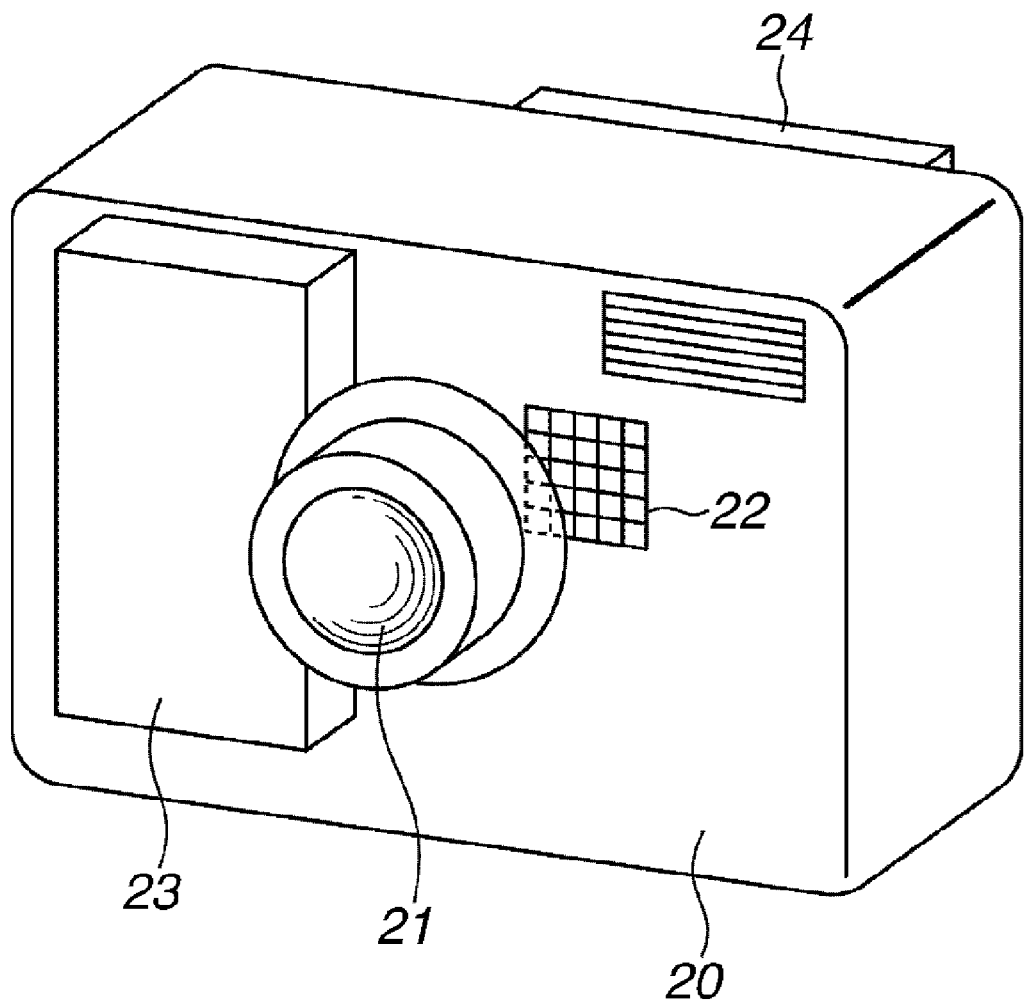
FIG. 13 illustrates an exemplary configuration of an image pickup apparatus according to an exemplary embodiment of the present invention.

FIG. 13 illustrates an exemplary configuration of a camera (image pickup apparatus) having the zoom lens according to an exemplary embodiment of the present invention.

The zoom lens according to each exemplary embodiment of the present invention is a photographic lens system used in an image pickup apparatus, such as a video camera, a digital still camera, a TV camera, or a silver-halide film camera.

In each of the diagrams showing a cross section of a zoom lens (FIGS. 1, 3, 5, 9, and 11), the object side (front side) is indicated at a left-hand portion of the figure, and the image side (rear side) is indicated at a right-hand portion thereof.

If the zoom lens according to each exemplary embodiment of the present invention is used as a projection lens for a projector, in each of the diagrams showing a cross section of a zoom lens (FIGS. 1, 3, 5, 9, and 11), the side of a screen is indicated at a left-hand portion of the figure, and the side of an image to be projected is indicated at a right-hand portion thereof.

In each of the diagrams showing a cross section of a zoom lens (FIGS. 1, 3, 5, 7, 9, and 11), "i" denotes the order of a lens unit from the object side and "Li" denotes an i-th lens unit. In addition, in each of the diagrams showing a cross section of a zoom lens (FIGS. 1, 3, 5, 7, 9, and 11), L1 denotes a first lens unit having a positive refractive power (optical power=an inverse of the focal length), L2 denotes a second lens unit having a negative refractive power, L3 denotes a third lens unit having a positive refractive power, L4 denotes a fourth lens unit having a positive refractive power, and L5 denotes a fifth lens unit having a positive or negative refractive power. An aperture stop SP is disposed on the object side of the third lens unit L3 or within the third lens unit L3.

In each of the diagrams showing a cross section of a zoom lens, "G" denotes an optical (glass) block that is equivalent to an optical filter, a face plate, a crystal low pass filter, or an infrared-light cut filter. "IP" denotes an image plane. The image plane IP is, when the zoom lens according to an exemplary embodiment of the present invention is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the optical system is used as a photographic optical system of a silver-halide film camera, equivalent to a film (photosensitive) surface.

In each of the aberration charts (FIGS. 2A through 2C, 4A through 4C, 6A through 6C, 8A through 8C, 10A through 10C, and 12A through 12C), "d" and "g" respectively denote d-line and g-line light. "ΔM" and "ΔS" respectively denote a meridional image plane and a sagittal image plane. Chromatic aberration of magnification (lateral chromatic aberration) is represented with g-line light. "ω" denotes a half angle of view, and "Fno" denotes an F-number.

In each of the above exemplary embodiments, each of the wide-angle end and the telephoto end refers to a zooming position when a lens unit for varying magnification is positioned at each of the ends of a range in which the magnification varying lens unit can mechanically move along an optical axis.

In each exemplary embodiment, each lens unit is moved in a manner indicated with an arrow in each corresponding lens cross section during zooming from the wide-angle end to the telephoto end.

More specifically, in each exemplary embodiment, the first lens unit L1 is movable with a locus convex towards the image side such that the first lens unit L1 is located closer to the object side at the telephoto end than at the wide-angle end, as indicated with an arrow in each corresponding figure, during zooming from the wide-angle end to the telephoto end.

In addition, the second lens unit L2 is movable with a locus convex towards the image side during zooming from the wide-angle end to the telephoto end. Furthermore, the third lens unit L3 is movable towards the object side during zooming from the wide-angle end to the telephoto end. The fourth lens unit L4 is movable with a locus convex towards the object side during zooming from the wide-angle end to the telephoto end.

As described above, in each exemplary embodiment, each lens unit is movable in the above-described manner during zooming. Accordingly, each exemplary embodiment can implement a zoom lens whose total size is small and having a high zoom ratio.

Moreover, each exemplary embodiment can prevent sharp light fall-off at edges, which may occur mainly at the wide-angle end or in the vicinity thereof.

In each exemplary embodiment, the first lens unit L1 and the third lens unit L3 are movable such that the first lens unit L1 and the third lens unit L3 are located closer to the object side at the telephoto end than at the wide-angle end during zooming. Accordingly, each exemplary embodiment can implement a zoom lens of a short lens total length (the distance from the first lens surface to the last lens surface) at the wide-angle end and having a high zoom ratio.

Furthermore, in each exemplary embodiment, the sensitivity of the zoom lens to decentering and tilt of the first lens unit L1 is reduced. In particular, in each exemplary embodiment, during zooming from the wide-angle end to the telephoto end, the third lens unit L3 is movable towards the object side. Accordingly, the third lens unit L3 contributes to variation of magnification (zooming).

In addition, in each exemplary embodiment, during zooming from the wide-angle end to the telephoto end, the first lens unit L1 having a positive refractive power is movable towards the object side. Thus, the second lens unit L2 greatly contributes to variation of magnification. Accordingly, each exemplary embodiment can implement a zoom lens having a high zoom ratio without so much increasing the refractive powers of the first lens unit L1 and the second lens unit L2.

Moreover, in each exemplary embodiment, during zooming from the wide-angle end to the telephoto end, the fourth lens unit L4 is movable with a locus convex towards the object side. With this configuration, each exemplary embodiment can effectively utilize the distance between the third lens unit L3 and the fourth lens unit L4. Accordingly, each exemplary embodiment can implement a zoom lens whose total size is small and having a high zoom ratio.

In each exemplary embodiment, as described above, the fourth lens unit L4 is movable with a locus convex towards the object side. Accordingly, each exemplary embodiment can effectively correct variation that may occur on the image plane and variation of chromatic aberration at a middle focal length position.

The zoom lens according to each exemplary embodiment is a rear focus type zoom lens that executes focusing by moving the fourth lens unit L4 along the optical axis. More specifically, each exemplary embodiment executes focusing from an infinitely-distant object to a short-distance object at the telephoto end by moving the fourth lens unit L4 forward, as indicated with an arrow 4c in each lens cross section.

In each lens cross section (FIGS. 1, 3, 5, 7, 9, and 11), a full line arrow 4a and a dotted line 4b indicate loci of moving the fourth lens unit L4 during zooming, for correcting the variation on the image plane, from the wide-angle end to the telephoto end when focusing on an infinitely-distant object and a short distance object, respectively.

Furthermore, in each exemplary embodiment, the third lens unit L3 having a positive refractive power is movable in a direction perpendicular to the optical axis. Accordingly, each exemplary embodiment corrects an image blur of a captured image that may occur when the entire optical system is vibrated. With this configuration, each exemplary embodiment can execute image stabilization without using an additional optical member such as a variable angle prism or a lens unit dedicated for image stabilization. Thus, each exemplary embodiment can prevent the increase of the size of the entire optical system.

As described above, each exemplary embodiment executes image stabilization by moving the third lens unit L3 in a direction perpendicular to the optical axis. However, the present invention is not limited to this. More specifically, if the third lens unit L3 is movable in such a way as to have a component perpendicular to the optical axis, an image blur can be corrected. In this case, if a complicated configuration of a lens barrel can be employed, the image stabilization can be executed by rotating the third lens unit L3 with a rotation center on the optical axis.

It is useful to use as small a number of lenses as possible in order to reduce the weight of the zoom lens and the effective lens diameter. In each exemplary embodiment, the first lens unit L1 includes a cemented lens, which is composed of one positive lens and one negative lens, and a positive lens. With this configuration, each exemplary embodiment can correct spherical aberration and chromatic aberration that may occur mainly at the telephoto end when the zoom ratio is increased.

The second lens unit L2 includes three lenses, which are a negative lens of a meniscus shape having a convex surface facing the object side, a negative lens having a concave surface facing the object side, and a positive lens having a convex surface facing the object side. With this configuration, each exemplary embodiment can reduce variation of aberration that may occur during zooming. In particular, each exemplary embodiment having the above-described configuration can effectively correct distortion that may occur at the wide-angle end and spherical aberration that may occur at telephoto end.

In addition, the second lens unit L2 has at least one aspheric surface. Accordingly, each exemplary embodiment can effectively correct curvature of field that may occur when the viewing angle is increased.

The third lens unit L3 includes, in order from the object side to the image side, a positive lens, a negative lens having a concave surface facing the image side, and a positive lens. With this configuration, each exemplary embodiment can effectively correct spherical aberration and coma that may particularly occur at the telephoto end. Furthermore, in executing image stabilization, each exemplary embodiment having the above-described configuration can reduce the amount of decentering aberration. Accordingly, each exemplary embodiment can achieve a high image stabilization performance.

The third lens unit L3 has at least one aspheric surface. Accordingly, each exemplary embodiment can effectively correct variation of aberration that may occur during zooming.

The fourth lens unit L4 includes one positive lens or a cemented lens composed of a positive lens and a negative lens, having a convex surface facing the object side. Moreover, the fourth lens unit L4 has at least one aspheric surface. Accordingly, each exemplary embodiment can suppress or at least reduce variation of aberration that may occur mainly during focusing. Furthermore, with the above-described configuration, each exemplary embodiment can implement a zoom lens whose total size is small.

The fourth exemplary embodiment includes a fifth lens unit L5 having a positive refractive power, which is disposed at a position closest to the image plane. The fifth lens unit L5 according to the fourth exemplary embodiment is stationary against the image plane during zooming.

The sixth exemplary embodiment includes a fifth lens unit L5 having a negative refractive power, which is disposed at a position closest to the image plane. The fifth lens unit L5 according to the sixth exemplary embodiment is stationary against the image plane during zooming. By using the fifth lens unit L5, it becomes easy to effectively correct various aberrations, such as curvature of field, reduce the size of the front lens, and achieve a high zoom ratio.

In each exemplary embodiment, a distance between the first lens unit L1 and the second lens unit L2 at the telephoto end (DT12), a distance between the second lens unit L2 and the third lens unit L3 at the telephoto end (DT23), a focal length of the first lens unit (f1), a focal length of the second lens unit (f2), and a focal length of the third lens unit (f3), and a focal length of the entire zoom lens at the wide-angle end (fw) satisfy the following conditions:

$$0.00 < DT23/DT12 < 0.06 \tag{1}$$

$$6.5 < f1/fw < 30.0 \tag{2}$$

$$-0.75 < f2/f3 < -0.10 \tag{3}$$

The condition (1) provides a condition for appropriately setting a position of each of the first lens unit L1, the second lens unit L2, and the third lens unit L3 at the telephoto end in order to implement a zoom lens whose total size is small and having a high zoom ratio. In addition, the condition (1) provides a condition for reducing the total lens length at the wide-angle end (the distance from the first lens surface to the last lens surface), preventing physical interference that may occur between the second lens unit L2 and the third lens unit L3, and also preventing degradation of the optical performance.

If the lower limit of the condition (1) is exceeded, then the lens distance DT12 between the first lens unit L1 and the second lens unit L2 becomes greater relative to the lens unit distance DT23 between the second lens unit L2 and the third lens unit L3. Accordingly, in this case, the lens total length at the wide-angle end may become great. As a result, it becomes difficult to implement a small-sized zoom lens. In addition, in this case, the second lens unit L2 and the third lens unit L3 may physically interfere with each other.

Furthermore, the amount of movement of the first lens unit L1 may become large. Accordingly, the optical performance may degrade due to image shake during zooming, vibration sound that may occur due to a zooming operation, and decentering of the lens barrel that may occur during zooming.

On the other hand, if the upper limit of the condition (1) is exceeded, then the effective diameter of the front lens may increase. Furthermore, the total size of the zoom lens may become large. In addition, it may become difficult to effectively correct chromatic aberration and spherical aberration that may occur at the telephoto end.

The condition (2) provides a condition for appropriately setting the ratio of the focal length f1 of the first lens unit L1, which contributes to variation of magnification, to the focal length fw of the entire zoom lens in order to achieve a zoom lens whose total size is small and having a high zoom ratio.

If the lower limit of the condition (2) is exceeded, i.e., if the focal length f1 of the first lens unit L1 becomes smaller (shorter) relative to the focal length fw of the entire zoom lens at the wide-angle end, then various aberrations, such as axial chromatic aberration (longitudinal chromatic aberration), chromatic aberration of magnification, and spherical aberration may increase at the telephoto end.

Moreover, in this case, it may become difficult to secure an appropriate thickness of a peripheral portion of the positive lens constituting the first lens unit L1. As a result, it becomes necessary to use a lens having a large effective diameter in manufacturing the lens.

On the other hand, if the upper limit of the condition (2) is exceeded, i.e., if the focal length f1 of the first lens unit L1 becomes larger (longer) relative to the focal length fw of the entire zoom lens at the wide-angle end, then the amount of moving of the first lens unit L1 during zooming may become large. As a result, the size of the entire zoom lens may become large. In addition, as the amount of movement of the first lens unit L1 increases, the amount of image shake or the vibration sound that may occur during zooming may increase.

The condition (3) provides a condition for appropriately setting the ratio of the focal length f2 of the second lens unit L2 to the focal length f3 of the third lens unit L3 in order to achieve a zoom lens having a wide angle of view, whose total size is small, and having a high optical performance during zooming from the wide-angle end to the telephoto end.

If the lower limit of the condition (3) is exceeded, i.e., if the focal length f2 of the second lens unit L2 becomes smaller (shorter) relative to the focal length f3 of the third lens unit L3, then it becomes difficult to correct chromatic aberration of magnification and astigmatism at the wide-angle end. Moreover, an opening angle of the negative lens of the second lens unit L2 may become large. As a result, it may become difficult to manufacture such a lens.

In addition, a large amount of coma may occur at a middle focal length. As a result, the variation on the image plane may increase. Moreover, the sensitivity to the possible degradation of the optical performance that may occur when the second lens unit L2 is decentered may become high. As a result, it becomes difficult to mount such a lens in the zoom lens.

Furthermore, if the image stabilization is executed by moving the third lens unit L3 in such a way as to have a component perpendicular to the optical axis, then the sensitivity of the third lens unit L3 to image stabilization may become low. Accordingly, the amount of movement of the third lens unit L3 during image stabilization may become large. As a result, the size of the entire zoom lens may become large.

The "sensitivity to image stabilization" refers to the ratio M/DL of the amount of displacement M of an image point in the direction perpendicular to the optical axis to the unit amount of movement DL of the third lens unit L3 (e.g., 1 mm).

On the other hand, if the upper limit of the condition (3) is exceeded, i.e., if the focal length f2 of the second lens unit L2 becomes larger (longer) relative to the focal length f3 of the third lens unit L3, then it becomes difficult to achieve a wide angle of view and to reduce the effective diameter of the front lens.

In addition, the amount of movement of the second lens unit L2 may become large as the zoom ratio increases. As a result, the size of the entire zoom lens may increase.

Moreover, if the sensitivity to the degradation of optical performance that may occur due to decentering of the third lens unit L3 becomes high and if image stabilization is executed by moving the third lens unit L3 in such a way as to have a component perpendicular to the optical axis, then the optical performance during image stabilization may be degraded.

With the above-described configuration, each exemplary embodiment of the present invention appropriately sets the focal length of each lens unit, the positional relationship among the lens units at the telephoto end, and the moving locus of each lens unit to satisfy the conditions (1) through (3). Accordingly, each exemplary embodiment having the above-described configuration can implement a compact zoom lens having a high optical performance in the entire zoom range, having a wide angle of view, having a high zoom ratio, whose front lens effective diameter is small, and whose total size is small.

In addition, the ranges of the values in the conditions (1) through (3) can be altered as follows:

$$0.001 < DT23/DT12 < 0.060 \quad (1a)$$

$$6.7 < f1/fw < 20.0 \quad (2a)$$

$$-0.7 < f2/f3 < -0.2 \quad (3a)$$

With the above-described configuration, each exemplary embodiment can implement a small-sized zoom lens having a high zoom ratio and a high optical performance in the entire zoom range.

In the present invention, it is further useful to satisfy at least one of the following conditions. More specifically, a distance between the third lens unit L3 and the fourth lens unit L4 at the telephoto end (DT34), the focal length of the fourth lens unit L4 (f4), the largest lens air space value of lens air space values within the third lens unit L3 (DL3), a thickness of the entire third lens unit L3 (DG3), a lateral magnification of the fourth lens unit L4 at the wide-angle end ($\beta 4w$), a lateral magnification of the fourth lens unit L4 at the telephoto end ($\beta 4t$), a lateral magnification of the second lens unit L2 at the wide-angle end ($\beta 2w$), and a lateral magnification of the second lens unit L2 at the telephoto end ($\beta 2t$) satisfy at least one of the following conditions:

$$-2.5 < f2/fw < -1.0 \quad (4)$$

$$0.00 < DT23/DT34 < 0.08 \quad (5)$$

$$0.1 < f3/f4 < 0.8 \quad (6)$$

$$-0.5 < f2/f4 < -0.2 \quad (7)$$

$$0.2 < DL3/DG3 < 0.5 \quad (8)$$

$$0.5 < \beta 4t/\beta 4w < 2.0 \quad (9)$$

$$2.0 < \beta 2t/\beta 2w < 6.0 \quad (10)$$

The condition (4) provides a condition for appropriately setting the ratio of the focal length f2 of the second lens unit L2, which contributes to variation of magnification, to the focal length fw of the entire zoom lens at the wide-angle end in order to achieve a zoom lens whose total size is small, having a wide angle of view, and having a high zoom ratio.

If the lower limit of the condition (4) is exceeded, i.e., if the focal length of the negative lens of the second lens unit L2 becomes larger relative to the focal length fw of the entire zoom lens at the wide-angle end, then it becomes difficult to reduce the effective diameter of the front lens and to achieve a wide angle of view.

In addition, it becomes difficult to correct astigmatism at a middle focal length. Furthermore, in this case, the amount of movement of the second lens unit L2 becomes large as the zoom ratio increases. Accordingly, the total length of the zoom lens may become large. As a result, it becomes difficult to reduce the size of the zoom lens.

On the other hand, if the upper limit of the condition (4) is exceeded, i.e., if the focal length f2 of the negative lens of the second lens unit L2 becomes smaller relative to the focal length fw of the entire zoom lens at the wide-angle end, then it becomes difficult to correct coma and variation on the image plane at a middle focal length.

Moreover, the sensitivity to the possible degradation of the optical performance that may occur when the second lens unit L2 is decentered becomes high. As a result, it becomes difficult to mount such a lens in the zoom lens.

The condition (5) provides a condition for appropriately defining the positional relationship among the second lens unit L2, the third lens unit L3, and the fourth lens unit L4 when the zoom lens focuses on an infinitely-distant object at the telephoto end in order to achieve a zoom lens whose total size is small and having a high zoom ratio. The condition (5) also provides a condition for reducing the total length of the lens at the telephoto end, for preventing the otherwise possible physical interference between the second lens unit L2 and the third lens unit L3, and for preventing the degradation of the optical performance.

If the lower limit of the condition (5) is exceeded, then the lens distance DT34 between the third lens unit L3 and the fourth lens unit L4 may become larger relative to the lens distance DT23 between the second lens unit L2 and the third lens unit L3.

Accordingly, the length of the entire zoom lens at the telephoto end becomes large. As a result, it becomes difficult to reduce the total size of the zoom lens.

In addition, in this case, the physical interference between the second lens unit L2 and the third lens unit L3 may easily occur. Moreover, if focusing is executed by using the fourth lens unit L4, the focusing sensitivity of the fourth lens unit L4 may decrease.

Accordingly, the amount of absorption of errors, which may occur due to lens spacing, by focusing may increase. In this case, a large amount of play (spacing) for focusing becomes necessary. As a result, the total size of the zoom lens becomes large.

Moreover, in this case, the optical performance obtained by moving the position of the fourth lens unit L4 to absorb errors may significantly degrade.

The "focusing sensitivity" refers to the ratio FDa/FD of the amount of displacement FDa of the image point (in-focus position) to the unit amount of moving of the fourth lens unit L4 (e.g., 1 mm).

On the other hand, if the upper limit of the condition (5) is exceeded, then the distance between the fourth lens unit L4 and the image plane becomes long. Accordingly, in this case, it becomes difficult to implement a small-size zoom lens having a high zoom ratio. Furthermore, it becomes difficult to reduce the effective diameter of the front lens. As a result, the total size of the zoom lens may increase.

The condition (6) provides a condition for appropriately setting the ratio of the focal length f3 of the third lens unit L3 to the focal length f4 of the fourth lens unit L4, which contributes to variation of magnification, in order to implement a small-size zoom lens having a high zoom ratio.

If the lower limit of the condition (6) is exceeded, i.e., if the focal length f3 of the third lens unit L3 becomes shorter relative to the focal length f4 of the third lens unit L4, then the stroke of the fourth lens unit L4 for focusing at the telephoto end particularly increases. As a result, the total lens length may increase. In addition, in this case, the refractive power of the third lens unit L3 increases. Accordingly, it becomes difficult to correct spherical aberration and coma.

Moreover, if the focal length f3 of the third lens unit L3 becomes shorter, then the variation of angle of incidence of a ray that enters the fourth lens unit L4 when focusing is executed by the fourth lens unit L4 at the telephoto end may increase. As a result, the amount of variation of the optical performance that may occur due to variation in the distance may increase.

Furthermore, if image stabilization is executed by moving the third lens unit L3 in such a way as to have a component perpendicular to the optical axis, then the sensitivity of the third lens unit L3 to image stabilization may become low. Accordingly, the amount of movement of the third lens unit L3 becomes large. As a result, the total size of the zoom lens becomes large.

On the other hand, if the upper limit of the condition (6) is exceeded, then the magnification distribution ratio of the third lens unit L3 becomes small. As a result, it becomes difficult to achieve a high zoom ratio. In addition, in this case, it becomes difficult to correct spherical aberration and coma.

Furthermore, if the focal length f4 of the fourth lens unit L4 becomes shorter, the angle of incidence of a ray incident on the imaging plane may greatly vary due to zooming. As a result, the color shading may increase.

The condition (7) provides a condition for appropriately setting the ratio of the focal length f2 of the second lens unit L2 to the focal length f4 of the fourth lens unit L4, which contributes to variation of magnification, in order to implement a small-size zoom lens having a high zoom ratio.

If the lower limit of the condition (7) is exceeded, i.e., if the focal length f2 of the second lens unit L2 becomes longer relative to the focal length f4 of the fourth lens unit L4, then it becomes difficult to reduce the effective diameter of the front lens and achieve a wide angle of view.

Furthermore, the degree of degradation of optical performance that may occur due to focusing may increase. In addition, it becomes difficult to correct astigmatism at a middle focal length. Moreover, in this case, the amount of movement of the second lens unit L2 becomes large. Accordingly, the total length of the zoom lens may become long. As a result, it becomes difficult to implement a small-size zoom lens.

On the other hand, if the upper limit of the condition (7) is exceeded, i.e., if the focal length f2 of the second lens unit L2 becomes shorter relative to the focal length f4 of the fourth lens unit L4, then it becomes difficult to correct coma and variation on the image plane at a middle focal length.

In addition, the sensitivity of the second lens unit L2, which is the ratio of the degree of degradation of the optical performance to the degree of decentering of the second lens unit L2, becomes high. As a result, it becomes difficult to mount such a lens in the zoom lens. Furthermore, in this case, the amount of movement of the fourth lens unit L4 for focusing may increase. Accordingly, in this case, the total length of the zoom lens may increase.

The condition (8) provides a condition for appropriately setting a value of lens spacing within the third lens unit L3 in order to achieve a high optical performance in the entire zoom range in order to achieve a small-size zoom lens having a high zoom ratio.

If the lower limit of the condition (8) is exceeded, i.e., if the lens distance value DL3, which is the largest of the values of lens air space within the third lens unit L3, becomes smaller relative to the thickness DG3 of the entire third lens unit L3, then it becomes difficult to correct astigmatism.

On the other hand, if the upper limit of the condition (8) is exceeded, i.e., if the lens distance value DL3, which is the largest of the values of lens air space within the third lens unit L3, becomes larger relative to the thickness DG3 of the entire third lens unit L3, then the thickness of the third lens unit L3 becomes too thick. As a result, the lens total length may increase.

In addition, in this case, the distance between the lenses becomes very large. As a result, a very high accuracy of mounting the lens becomes necessary. Accordingly, it becomes difficult to mount such a lens in the zoom lens.

The condition (9) provides a condition for appropriately setting a lateral magnification $\beta 4w$ of the fourth lens unit L4 at the wide-angle end and a lateral magnification $\beta 4t$ of the fourth lens unit L4 at the telephoto end in order to implement a small-size zoom lens having a high zoom ratio.

If the lower limit of the condition (9) is exceeded, i.e., if the lateral magnification $\beta 4t$ of the fourth lens unit L4 at the telephoto end becomes too small, then the sensitivity of the fourth lens unit L4 when focusing is executed by using the fourth lens unit L4 becomes small. Accordingly, in this case, the amount of moving the fourth lens unit L4 becomes large. As a result, the lens total length may become long.

On the other hand, if the upper limit of the condition (9) is exceeded, i.e., if the lateral magnification $\beta 4t$ of the fourth lens unit L4 at the telephoto end becomes large, then it becomes difficult to achieve a zoom lens whose total lens length is short having a high zoom ratio at the same time.

Moreover, in this case, the degree of variation of the optical performance during focusing may increase. In addition, the color shading may increase due to a large amount of variation of the angle of incidence of a ray that enters the imaging plane during zooming.

The condition (10) provides a condition for appropriately setting a lateral magnification $\beta 2w$ of the second lens unit L2 at the wide-angle end and a lateral magnification $\beta 2t$ of the second lens unit L2 at the telephoto end in order to implement a small-size zoom lens having a high zoom ratio.

If the lower limit of the condition (10) is exceeded, i.e., if the lateral magnification $\beta 2t$ of the second lens unit L2 becomes too small, then it becomes difficult to correct coma and variation on the image plane. In addition, in this case, the effective diameter of the front lens may increase.

On the other hand, if the upper limit of the condition (10) is exceeded, i.e., if the lateral magnification $\beta 2t$ of the second lens unit L2 at the telephoto end becomes too large, then the amount of movement of the second lens unit L2 towards the object side may become large.

Accordingly, in this case, the lens total length may become long. As a result, the size of the entire zoom lens may increase.

In each exemplary embodiment, in order to reduce the variation of aberrations that may occur during aberration correction or zooming while reducing the size of the entire zoom lens, the ranges of the values in the conditional expressions (4) through (10) can be altered as follows:

$$-2.0 < f2/fw < -1.0 \qquad (4a)$$

$$0.001 < DT23/DT34 < 0.070 \qquad (5a)$$

$$0.15 < f3/f4 < 0.70 \qquad (6a)$$

$$-0.45 < f2/f4 < -0.2 \qquad (7a)$$

$$0.22 < DL3/DG3 < 0.44 \qquad (8a)$$

$$0.7 < \beta 4t/\beta 4w < 1.8 \qquad (9a)$$

$$2.2 < \beta 2t/\beta 2w < 5.8 \qquad (10a)$$

In each exemplary embodiment, it is further useful if the first lens unit L1 in each exemplary embodiment includes three lenses, namely, in order from the object side to the image side, a negative lens, a positive lens, and a positive lens. With this configuration, spherical aberration and chromatic aberration that may occur mainly at the telephoto end can be easily and effectively corrected.

It is yet further useful if the third lens unit L3 according to each exemplary embodiment includes, in order from the object side to the image side, a positive lens and a negative lens. With this configuration, spherical aberration that may occur mainly at the telephoto end and coma and astigmatism that may occur in the entire zoom range can be easily and effectively corrected.

Furthermore, if the front side principal point of the third lens unit L3 is disposed at a position close to the object side as in this case, then it becomes easy to achieve a high zoom ratio.

It is yet further useful if the third lens unit L3 includes at least two positive lenses and one negative lens. With this configuration, coma, which may occur in the entire zoom range, can be effectively and easily corrected.

It is yet further useful if the fourth lens unit L4 includes a positive lens or a cemented lens composed of a positive lens and a negative lens. With this configuration, it becomes easy to implement a zoom lens whose total size is small and capable of executing focusing by using the fourth lens unit L4 at a high focusing speed.

As described above, in each exemplary embodiment of the present invention, a zoom lens can be implemented whose total size is small, having a high optical performance in the entire zoom range, having a wide angle of view, having a high zoom ratio, whose effective diameter of the front lens is small, and whose total length is short.

Numerical examples 1 through 6, which respectively correspond to the first through the sixth exemplary embodiments of the present invention, are set forth below. In each of the numerical examples 1 through 6, "i" denotes the order of a surface from the object side, "ri" denotes a radius of curvature of the i-th optical surface (an i-th surface), "di" denotes an axial interval between the i-th surface and the (i+1)th surface, "ndi" and "vdi" respectively denote a refractive index and an Abbe number of the i-th optical material with respect to d-line light.

In addition, "k" denotes a conic coefficient, and each of "A4", "A6", "A8", and "A10" denotes an aspheric coefficient. The aspheric shape is expressed as:

$$x=(h^2/R)/[1+\{1-(1+k)(h/R)^2\}^{1/2}]+A4h^4+A6h^6+A8h^8+A10h^{10}$$

where "x" denotes a displacement from a surface vertex along the optical axis in a position at a height "h" from the optical axis, and "R" denotes a radius of curvature. Furthermore, "E-Z" denotes "×10$^{-Z}$." "BF" denotes an air-equivalent back focal length.

In each of the following numerical examples, two surfaces closest to the image side are a glass material (optical block), such as a filter or a face plate. In addition, the relationship between each condition described above and each numerical example is set forth in Table 1.

Numerical Example 1
Unit: mm

Surface data

| Surface No. | r | di | nd | vd |
|---|---|---|---|---|
| 1 | 48.562 | 1.20 | 1.84666 | 23.9 |
| 2 | 24.861 | 4.20 | 1.48749 | 70.2 |
| 3 | −322.030 | 0.20 | | |
| 4 | 22.336 | 2.80 | 1.77250 | 49.6 |
| 5 | 70.138 | Variable | | |
| 6* | 220.348 | 1.10 | 1.85960 | 40.4 |
| 7* | 5.055 | 3.60 | | |
| 8 | −11.343 | 0.65 | 1.58313 | 59.4 |
| 9 | 259.998 | 0.20 | | |
| 10 | 18.720 | 1.60 | 1.92286 | 18.9 |
| 11 | −103.908 | Variable | | |
| 12* | 8.606 | 2.00 | 1.68540 | 52.3 |
| 13 | −88.984 | 1.30 | | |
| stop | ∞ | 1.91 | | |
| 14 | | | | |
| 15 | 20.814 | 0.70 | 1.92286 | 18.9 |
| 16 | 7.381 | 0.50 | | |
| 17 | 17.325 | 1.60 | 1.51742 | 52.4 |
| 18 | −17.325 | Variable | | |
| 19* | 16.501 | 2.10 | 1.68540 | 52.3 |
| 20 | −34.252 | 0.65 | 1.92286 | 18.9 |
| 21 | −101.656 | Variable | | |
| Image plane | ∞ | | | |

Aspheric Coefficients

| r6 | K = −4.36817e+003 | A4 = 7.84461e−005 | A6 = −1.11803e−006 |
|---|---|---|---|
| | A8 = 4.37742e−009 | | |
| r7 | K = −7.53573e−001 | A4 = 3.38148e−004 | A6 = 1.09789e−005 |
| | A8 = 5.57043e−008 | | |
| r12 | K = 3.10477e+000 | A4 = −8.34539e−004 | A6 = −3.11372e−005 |
| | A8 = 1.83787e−006 | A10 = −2.66664e−007 | |
| r19 | K = 5.97792e+000 | A4 = −1.62077e−004 | A6 = −2.19872e−008 |
| | A8 = −1.24320e−007 | | |

Various Data

| Zoom ratio | 10.31 | | | | |
|---|---|---|---|---|---|
| Focal Length | 5.11 | 19.63 | 52.65 | 41.09 | 7.52 |
| F-number | 3.39 | 4.60 | 5.84 | 5.15 | 3.87 |
| Angle of View | 37.18 | 11.17 | 4.21 | 5.39 | 27.28 |
| Image Height | 3.88 | 3.88 | 3.88 | 3.88 | 3.88 |
| Lens Total Length | 52.30 | 60.93 | 72.25 | 70.14 | 50.88 |
| BF | 8.17 | 13.23 | 4.84 | 8.90 | 10.12 |
| d5 | 0.70 | 12.62 | 20.31 | 19.25 | 2.04 |
| d11 | 14.38 | 2.43 | 1.20 | 1.00 | 8.52 |
| d18 | 2.75 | 6.35 | 19.59 | 14.68 | 3.90 |
| d21 | 7.01 | 12.07 | 3.68 | 7.74 | 8.96 |
| d23 | 0.50 | 0.50 | 0.50 | 0.50 | 0.50 |

Focal Length of Each Lens Unit

| Lens unit | First surface | Focal length |
|---|---|---|
| L1 | 1 | 35.24 |
| L2 | 6 | −6.72 |
| L3 | 12 | 13.68 |
| L4 | 19 | 23.01 |

Numerical Example 2
Unit: mm

Surface data

| Surface No. | r | di | nd | vd |
|---|---|---|---|---|
| 1 | 56.442 | 1.20 | 1.84666 | 23.9 |
| 2 | 30.613 | 4.50 | 1.48749 | 70.2 |
| 3 | −145.984 | 0.20 | | |
| 4 | 24.934 | 2.80 | 1.69680 | 55.5 |
| 5 | 69.079 | Variable | | |
| 6* | 55.305 | 1.55 | 1.84862 | 40.0 |
| 7* | 5.338 | 3.40 | | |
| 8 | −12.484 | 0.60 | 1.77250 | 49.6 |
| 9 | 54.683 | 0.20 | | |
| 10 | 16.904 | 1.50 | 1.92286 | 18.9 |
| 11 | −95.759 | Variable | | |
| 12* | 9.832 | 1.80 | 1.76753 | 49.3 |
| 13 | −125.855 | 1.00 | | |
| stop | ∞ | 1.50 | | |
| 14 | | | | |
| 15 | 16.189 | 0.70 | 1.94595 | 18.0 |
| 16 | 8.072 | 0.58 | | |
| 17 | 48.328 | 1.60 | 1.48749 | 70.2 |
| 18 | −13.136 | Variable | | |
| 19* | 15.762 | 2.50 | 1.58313 | 59.4 |
| 20 | −23.313 | 0.60 | 1.84666 | 23.9 |
| 21 | −76.868 | Variable | | |
| Image plane | ∞ | | | |

Aspheric Coefficients

| r6 | K = 0.00000e+000 | A8 = −2.71167e−008 | A10 = 2.91406e−010 |
|---|---|---|---|
| r7 | K = −1.29019e+000 | A4 = 9.02395e−004 | A6 = 1.36547e−005 |
| | A8 = −1.79305e−008 | | |
| r12 | K = −1.65091e+000 | A4 = 1.15345e−005 | A6 = 4.90350e−006 |
| | A8 = −5.77855e−007 | A10 = 2.46059e−008 | |
| r19 | K = −8.33205e+000 | A4 = 2.53126e−004 | A6 = −1.28096e−006 |

Various Data

| Zoom ratio | 11.43 | | | | |
|---|---|---|---|---|---|
| Focal Length | 5.12 | 20.92 | 58.56 | 46.77 | 8.98 |
| F-number | 3.50 | 4.56 | 5.51 | 5.14 | 3.93 |
| Angle of View | 35.69 | 10.49 | 3.79 | 4.74 | 23.35 |
| Image Height | 3.68 | 3.88 | 3.88 | 3.88 | 3.88 |
| Lens Total Length | 56.59 | 66.32 | 77.41 | 75.50 | 57.95 |
| BF | 6.34 | 12.79 | 7.75 | 10.30 | 9.24 |
| d5 | 0.75 | 15.61 | 23.99 | 22.79 | 6.22 |
| d11 | 16.78 | 3.93 | 0.67 | 1.21 | 9.63 |
| d18 | 6.47 | 7.75 | 18.76 | 14.97 | 6.62 |

-continued

Numerical Example 2
Unit: mm

|     |      |       |      |      |      |
| --- | ---- | ----- | ---- | ---- | ---- |
| d21 | 5.18 | 11.64 | 6.59 | 9.14 | 8.08 |
| d23 | 0.50 | 0.50  | 0.50 | 0.50 | 0.50 |

Focal Length of Each Lens Unit

| Lens unit | First surface | Focal length |
| --- | --- | --- |
| L1 | 1  | 40.49 |
| L2 | 6  | −6.65 |
| L3 | 12 | 13.30 |
| L4 | 19 | 27.30 |

Numerical Example 3
Unit: mm

Surface data

| Surface No. | r | di | nd | vd |
| --- | --- | --- | --- | --- |
| 1    | 46.100   | 1.20     | 1.84666 | 23.9 |
| 2    | 24.294   | 4.10     | 1.48749 | 70.2 |
| 3    | −533.604 | 0.20     |         |      |
| 4    | 23.154   | 2.80     | 1.77250 | 49.6 |
| 5    | 78.257   | Variable |         |      |
| 6*   | 137.194  | 1.10     | 1.85960 | 40.4 |
| 7*   | 4.989    | 3.50     |         |      |
| 8    | −11.597  | 0.65     | 1.60311 | 60.6 |
| 9    | 113.625  | 0.20     |         |      |
| 10   | 17.794   | 1.60     | 1.92286 | 18.9 |
| 11   | −128.482 | Variable |         |      |
| stop 12 | ∞    | 0.50     |         |      |
| 13*  | 8.505    | 2.00     | 1.68540 | 52.3 |
| 14   | −88.984  | 3.13     |         |      |
| 15   | 18.584   | 0.70     | 1.92286 | 18.9 |
| 16   | 7.186    | 0.50     |         |      |
| 17   | 16.972   | 1.50     | 1.51742 | 52.4 |
| 18   | −21.703  | Variable |         |      |
| 19*  | 16.149   | 2.40     | 1.68540 | 52.3 |
| 20   | −25.089  | 0.60     | 1.92286 | 18.9 |
| 21   | −54.039  | Variable |         |      |
| Image plane | ∞ |       |         |      |

Aspheric Coefficients

| r6  | K = 1.44609e+001   | A4 = 3.70710e−005   | A6 = −1.29006e−006 |
|     | A8 = 9.45173e−009  |                     |                    |
| r7  | K = −6.46572e−001  | A4 = 2.80717e−004   | A6 = 7.91116e−006  |
|     | A8 = −2.52287e−008 |                     |                    |
| r13 | K = 3.41865e+000   | A4 = −9.21812e−004  | A6 = −3.48871e−005 |
|     | A8 = 1.25417e−006  | A10 = −2.66664e−007 |                    |
| r19 | K = 4.70183e+000   | A4 = −1.49494e−004  | A6 = 1.35226e−007  |
|     | A8 = −8.47311e−008 |                     |                    |

Various Data

| Zoom ratio       | 10.30 |       |       |       |       |
| ---------------- | ----- | ----- | ----- | ----- | ----- |
| Focal Length     | 5.11  | 16.20 | 52.65 | 37.05 | 7.45  |
| F-number         | 3.39  | 4.16  | 5.35  | 4.65  | 3.74  |
| Angle of View    | 37.17 | 13.45 | 4.21  | 5.97  | 27.49 |
| Image Height     | 3.88  | 3.88  | 3.88  | 3.88  | 3.88  |
| Lens Total Length| 52.42 | 60.03 | 73.59 | 70.77 | 50.71 |
| BF               | 7.78  | 12.76 | 6.67  | 10.40 | 10.08 |
| d5               | 0.70  | 10.97 | 20.82 | 19.01 | 1.68  |
| d11              | 13.60 | 2.86  | 0.50  | 0.76  | 7.66  |
| d18              | 3.65  | 6.76  | 18.92 | 13.92 | 4.61  |

-continued

Numerical Example 3
Unit: mm

|     |      |       |      |      |      |
| --- | ---- | ----- | ---- | ---- | ---- |
| d21 | 6.49 | 11.47 | 5.38 | 9.10 | 8.79 |
| d23 | 0.50 | 0.50  | 0.50 | 0.50 | 0.50 |

Focal Length of Each Lens Unit

| Lens unit | First surface | Focal length |
| --- | --- | --- |
| L1 | 1  | 35.49 |
| L2 | 6  | −6.53 |
| L3 | 12 | 13.75 |
| L4 | 19 | 20.24 |

Numerical Example 4
Unit: mm

Surface data

| Surface No. | r | di | nd | vd |
| --- | --- | --- | --- | --- |
| 1    | 47.493   | 1.20     | 1.84666 | 23.9 |
| 2    | 24.370   | 4.20     | 1.48749 | 70.2 |
| 3    | −261.849 | 0.20     |         |      |
| 4    | 22.346   | 2.80     | 1.77250 | 49.6 |
| 5    | 72.489   | Variable |         |      |
| 6*   | 179.521  | 1.20     | 1.85960 | 40.4 |
| 7*   | 5.066    | 3.60     |         |      |
| 8    | −10.829  | 0.65     | 1.58313 | 59.4 |
| 9    | 102.210  | 0.20     |         |      |
| 10   | 18.849   | 1.60     | 1.92286 | 18.9 |
| 11   | −88.665  | Variable |         |      |
| 12*  | 8.613    | 2.00     | 1.68540 | 52.3 |
| 13   | −88.984  | 1.30     |         |      |
| stop 14 | ∞    | 1.90     |         |      |
| 15   | 19.090   | 0.70     | 1.92286 | 18.9 |
| 16   | 7.413    | 0.50     |         |      |
| 17   | 20.593   | 1.60     | 1.51742 | 52.4 |
| 18   | −20.593  | Variable |         |      |
| 19*  | 16.542   | 2.10     | 1.68540 | 52.3 |
| 20   | −26.247  | 0.65     | 1.92286 | 18.9 |
| 21   | −66.702  | Variable |         |      |
| 22   | −124.575 | 1.30     | 1.51633 | 64.1 |
| 23   | −54.482  | Variable |         |      |
| Image plane | ∞ |       |         |      |

Aspheric Coefficients

| r6  | K = −2.60799e+003  | A4 = 8.89173e−005   | A6 = −1.21653e−006 |
|     | A8 = 4.09157e−009  |                     |                    |
| r7  | K = −6.60842e−001  | A4 = 2.98790e−004   | A6 = 1.11252e−005  |
|     | A8 = 1.10444e−007  |                     |                    |
| r12 | K = 3.13668e+000   | A4 = −8.35642e−004  | A6 = −3.08920e−005 |
|     | A8 = 1.76517e−006  | A10 = −2.66664e−007 |                    |
| r19 | K = 5.36390e+000   | A4 = −1.54107e−004  | A6 = 6.45448e−008  |
|     | A8 = −9.79706e−008 |                     |                    |

Various Data

| Zoom ratio       | 10.31 |       |       |       |       |
| ---------------- | ----- | ----- | ----- | ----- | ----- |
| Focal Length     | 5.11  | 19.80 | 52.65 | 41.71 | 7.44  |
| F-number         | 3.39  | 4.66  | 5.14  | 4.83  | 3.89  |
| Angle of View    | 37.20 | 11.07 | 4.21  | 5.31  | 27.51 |
| Image Height     | 3.88  | 3.88  | 3.88  | 3.88  | 3.88  |
| Lens Total Length| 52.28 | 61.29 | 71.68 | 69.83 | 51.07 |
| BF               | 5.71  | 5.71  | 5.71  | 5.71  | 5.71  |
| d5               | 0.70  | 12.17 | 20.41 | 19.15 | 1.78  |
| d11              | 13.83 | 2.31  | 0.51  | 0.50  | 8.32  |

-continued

Numerical Example 4
Unit: mm

|  |  |  |  |  |  |
|---|---|---|---|---|---|
| d18 | 1.81 | 4.82 | 15.79 | 11.83 | 2.82 |
| d21 | 2.53 | 8.57 | 1.55 | 4.94 | 4.73 |
| d23 | 4.55 | 4.55 | 4.55 | 4.55 | 4.55 |
| d25 | 0.50 | 0.50 | 0.50 | 0.50 | 0.50 |

Focal Length of Each Lens Unit

| Lens unit | First surface | Focal length |
|---|---|---|
| L1 | 1 | 34.33 |
| L2 | 6 | −6.47 |
| L3 | 12 | 14.13 |
| L4 | 19 | 21.82 |
| L5 | 22 | 186.36 |

Numerical Example 5
Unit: mm

Surface data

| Surface No. | r | di | nd | vd |
|---|---|---|---|---|
| 1 | 35.420 | 1.20 | 1.80518 | 25.4 |
| 2 | 23.694 | 4.60 | 1.48749 | 70.2 |
| 3 | 101.691 | 0.20 | | |
| 4 | 27.989 | 3.00 | 1.69680 | 55.5 |
| 5 | 70.601 | Variable | | |
| 6* | 424.632 | 1.10 | 1.85960 | 40.4 |
| 7* | 5.051 | 4.18 | | |
| 8 | −11.688 | 0.80 | 1.69680 | 55.5 |
| 9 | −34.798 | 0.20 | | |
| 10 | 27.287 | 1.80 | 1.92286 | 18.9 |
| 11 | −52.859 | Variable | | |
| stop | ∞ | −0.20 | | |
| 12 | | | | |
| 13* | 8.560 | 2.50 | 1.68540 | 52.3 |
| 14 | −45.840 | 2.77 | | |
| 15 | 24.534 | 0.76 | 1.92286 | 18.9 |
| 16 | 6.941 | 0.50 | | |
| 17 | 13.835 | 1.70 | 1.69680 | 55.5 |
| 18 | −23.089 | Variable | | |
| 19* | 18.124 | 2.20 | 1.69350 | 53.2 |
| 20 | −23.313 | 0.60 | 1.84666 | 23.9 |
| 21 | −160.163 | Variable | | |
| Image plane | ∞ | | | |

Aspheric Coefficients r6  K = −4.49652e+004  A4 = 1.06321e−004  A6 = −1.55003e−006
    A8 = 7.91875e−009
r7  K = −7.34115e−001  A4 = 1.12003e−004  A6 = 1.23574e−005
    A8 = −1.69913e−007
r13 K = 2.96284e+000  A4 = −8.34192e−004  A6 = −2.80046e−005
    A8 = 1.68691e−006  A10 = −2.66664e−007
r19 K = 9.10560e+000  A4 = −2.73974e−004  A6 = 4.44006e−006
    A8 = −2.70039e−007

Various Data

| Zoom ratio | 8.01 | | | | |
|---|---|---|---|---|---|
| Focal Length | 4.38 | 7.62 | 35.10 | 18.33 | 5.86 |
| F-number | 3.40 | 3.90 | 5.85 | 5.18 | 3.55 |
| Angle of View | 41.50 | 26.96 | 6.30 | 11.94 | 33.46 |
| Image Height | 3.88 | 3.88 | 3.88 | 3.88 | 3.88 |
| Lens Total Length | 53.81 | 53.20 | 74.81 | 67.30 | 50.90 |
| BF | 4.65 | 6.04 | 2.26 | 3.38 | 6.22 |

-continued

Numerical Example 5
Unit: mm

|  |  |  |  |  |  |
|---|---|---|---|---|---|
| d5 | 0.80 | 5.31 | 25.65 | 17.75 | 2.56 |
| d11 | 16.01 | 7.52 | 0.98 | 3.67 | 9.99 |
| d18 | 5.05 | 7.03 | 18.62 | 15.19 | 4.82 |
| d20 | 3.49 | 4.88 | 1.10 | 2.22 | 5.06 |
| d22 | 0.50 | 0.50 | 0.50 | 0.50 | 0.50 |

Focal Length of Each Lens Unit

| Lens unit | First surface | Focal length |
|---|---|---|
| L1 | 1 | 50.53 |
| L2 | 6 | −7.47 |
| L3 | 12 | 12.08 |
| L4 | 19 | 23.60 |

Numerical Example 6
Unit: mm

Surface data

| Surface No. | r | di | nd | vd |
|---|---|---|---|---|
| 1 | 35.154 | 1.20 | 1.80518 | 25.4 |
| 2 | 23.910 | 4.60 | 1.48749 | 70.2 |
| 3 | 104.921 | 0.20 | | |
| 4 | 28.022 | 3.00 | 1.69680 | 55.5 |
| 5 | 66.714 | Variable | | |
| 6* | 141.854 | 1.10 | 1.85960 | 40.4 |
| 7* | 5.066 | 4.36 | | |
| 8 | −11.688 | 0.80 | 1.69680 | 55.5 |
| 9 | −36.194 | 0.20 | | |
| 10 | 28.062 | 1.80 | 1.92286 | 18.9 |
| 11 | −55.338 | Variable | | |
| stop | ∞ | −0.20 | | |
| 12 | | | | |
| 13* | 8.903 | 2.50 | 1.68540 | 52.3 |
| 14 | −41.123 | 3.02 | | |
| 15 | 23.473 | 0.76 | 1.92286 | 18.9 |
| 16 | 6.940 | 0.50 | | |
| 17 | 12.648 | 1.70 | 1.69680 | 55.5 |
| 18 | −32.555 | Variable | | |
| 19* | 16.307 | 2.20 | 1.68540 | 52.3 |
| 20 | −44.972 | Variable | | |
| 21 | −91.464 | 0.60 | 1.69680 | 55.5 |
| 22 | 92.915 | Variable | | |
| Image plane | ∞ | | | |

Aspheric Coefficients r6  K = −1.46574e+003  A4 = 8.10927e−005  A6 = −1.03070e−006
    A8 = 4.68000e−009
r7  K = −7.21778e−001  A4 = 9.68862e−005  A6 = 9.30949e−006
    A8 = −7.11366e−008
r13 K = 2.92555e+000  A4 = −7.37954e−004  A6 = −2.56766e−005
    A8 = 2.18221e−006  A10 = −2.66664e−007
r19 K = 5.79008e+000  A4 = −2.56772e−004  A6 = 4.16766e−006
    A8 = −1.99073e−007

Various Data

| Zoom ratio | 8.04 | | | | |
|---|---|---|---|---|---|
| Focal Length | 4.37 | 7.69 | 35.10 | 18.50 | 5.95 |
| F-number | 3.40 | 3.91 | 5.69 | 5.14 | 3.60 |
| Angle of View | 41.58 | 26.73 | 6.30 | 11.83 | 33.06 |
| Image Height | 3.88 | 3.88 | 3.88 | 3.88 | 3.88 |
| Lens Total Length | 55.70 | 54.78 | 76.69 | 68.92 | 52.62 |

-continued

Numerical Example 6
Unit: mm

| BF | 2.71 | 2.71 | 2.71 | 2.71 | 2.71 |
|---|---|---|---|---|---|
| d5 | 0.80 | 5.19 | 25.68 | 17.73 | 2.39 |
| d11 | 17.08 | 7.98 | 0.97 | 3.86 | 10.58 |
| d18 | 5.66 | 8.26 | 18.35 | 15.41 | 6.37 |
| d20 | 1.10 | 2.29 | 0.64 | 0.85 | 2.23 |
| d22 | 1.55 | 1.55 | 1.55 | 1.55 | 1.55 |
| d24 | 0.50 | 0.50 | 0.50 | 0.50 | 0.50 |

Focal Length of Each Lens Unit

| Lens unit | First surface | Focal length |
|---|---|---|
| L1 | 1 | 50.84 |
| L2 | 6 | −7.47 |
| L3 | 12 | 12.37 |
| L4 | 19 | 17.72 |
| L5 | 21 | −66.06 |

TABLE 1

| | Numerical Example | | | | | |
|---|---|---|---|---|---|---|
| Condition | 1 | 2 | 3 | 4 | 5 | 6 |
| (1) | 0.059 | 0.028 | 0.048 | 0.025 | 0.030 | 0.030 |
| (2) | 6.898 | 7.904 | 6.944 | 6.724 | 11.539 | 11.638 |
| (3) | −0.492 | −0.500 | −0.475 | −0.458 | −0.618 | −0.604 |
| (4) | −1.316 | −1.298 | −1.277 | −1.267 | −1.706 | −1.711 |
| (5) | 0.061 | 0.036 | 0.053 | 0.033 | 0.042 | 0.042 |
| (6) | 0.594 | 0.487 | 0.679 | 0.647 | 0.512 | 0.698 |
| (7) | −0.292 | −0.244 | 0.322 | −0.296 | −0.317 | −0.422 |
| (8) | 0.401 | 0.348 | 0.400 | 0.400 | 0.337 | 0.356 |
| (9) | 1.209 | 0.926 | 1.101 | 1.087 | 1.134 | 1.037 |
| (10) | 4.782 | 5.005 | 5.061 | 5.643 | 2.936 | 2.998 |

An exemplary embodiment of a digital still camera (an example of an image pickup apparatus) that uses, as a photographic optical system, a zoom lens according to each exemplary embodiment of the present invention is described below with reference to FIG. 13.

Referring to FIG. 13, the digital still camera includes a camera body 20 and a photographic optical system 21. The photographic optical system 21 includes a zoom lens according to any of the first to the sixth exemplary embodiments described above.

The camera body 20 further includes a solid-state image sensor (photoelectric conversion element) 22, such as a CCD sensor or a CMOS sensor, configured to receive an object image formed by the photographic optical system 21. The camera body 20 further includes a memory 23 configured to record data corresponding to the object image photoelectrically converted by the solid-state image sensor 22. The camera body 20 further includes a viewfinder 24, which includes a liquid crystal display (LCD) panel and is configured to allow a user to observe an object image formed on the solid-state image sensor 22.

By applying the zoom lens according to each exemplary embodiment of the present invention to an image pickup apparatus such as a digital still camera, a small-size image pickup apparatus having a high optical performance can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-205516 filed Aug. 8, 2008, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a fourth lens unit having a positive refractive power,
   wherein each lens unit is movable for zooming,
   wherein the first lens unit and the third lens unit are movable such that the first lens unit and the third lens unit are located closer to the object side at a telephoto end than at a wide-angle end,
   wherein the fourth lens unit is movable with a locus convex towards the object side, and
   wherein a distance between the first lens unit and the second lens unit at the telephoto end (DT12), a distance between the second lens unit and the third lens unit at the telephoto end (DT23), a focal length of the first lens unit (f1), a focal length of the second lens unit (f2), and a focal length of the third lens unit (f3), and a focal length of the entire zoom lens at the wide-angle end (fw) satisfy the following conditions:

$$0.00 < DT23/DT12 < 0.06$$

$$6.5 < f1/fw < 30.0$$

$$-0.75 < f2/f3 < -0.10.$$

2. The zoom lens according to claim 1, wherein the focal length of the second lens unit (f2) satisfies the following condition:

$$-2.5 < f2/fw < -1.0.$$

3. The zoom lens according to claim 1, wherein a distance between third lens unit and the fourth lens unit at the telephoto end (DT34) satisfies the following condition:

$$0.00 < DT23/DT34 < 0.08.$$

4. The zoom lens according to claim 1, wherein a focal length of the fourth lens unit (f4) satisfies the following condition:

$$0.1 < f3/f4 < 0.8.$$

5. The zoom lens according to claim 1, wherein a focal length of the fourth lens unit (f4) satisfies the following condition:

$$-0.5 < f2/f4 < -0.2.$$

6. The zoom lens according to claim 1, wherein a largest lens air space value of lens air space values within the third lens unit (DL3) and a thickness of the entire third lens unit (DG3) satisfy the following condition:

$$0.2 < DL3/DG3 < 0.5.$$

7. The zoom lens according to claim 1, wherein a lateral magnification of the fourth lens unit at the wide-angle end (β4w) and a lateral magnification of the fourth lens unit at the telephoto end (β4t) satisfy the following condition:

$$0.5 < \beta 4t/\beta 4w < 2.0.$$

8. The zoom lens according to claim 1, wherein a lateral magnification of the second lens unit at the wide-angle end ($\beta 2w$) and a lateral magnification of the second lens unit at the telephoto end ($\beta 2t$) satisfy the following condition:

$$2.0 < \beta 2t/\beta 2w < 6.0.$$

9. The zoom lens according to claim 1, wherein the first lens unit includes, in order from the object side to the image side, a negative lens, a positive lens, and a positive lens.

10. The zoom lens according to claim 1, wherein the third lens unit includes, in order from the object side to the image side, a positive lens and a negative lens.

11. The zoom lens according to claim 1, wherein the third lens unit includes two positive lenses and one negative lens.

12. The zoom lens according to claim 1, wherein the fourth lens unit includes a positive lens or a cemented lens composed of a positive lens and a negative lens cemented to each other.

13. The zoom lens according to claim 1, wherein the third lens unit is movable in such a way as to have a component perpendicular to an optical axis to correct shake of a captured image when the zoom lens is vibrated.

14. The zoom lens according to claim 1, wherein the zoom lens is configured to form an image on a solid-state image sensor.

15. An image pickup apparatus comprising:

the zoom lens according to claim 1; and a solid-state image sensor configured to receive an image formed by the zoom lens.

* * * * *